(12) United States Patent
Tsuboi et al.

(10) Patent No.: US 8,045,538 B2
(45) Date of Patent: Oct. 25, 2011

(54) WIRELESS COMMUNICATION METHOD, RECEIVING METHOD, AND WIRELESS COMMUNICATION DEVICE

(75) Inventors: Hidekazu Tsuboi, Osaka (JP); Hiroshi Katsuragawa, Osaka (JP); Wahoh Oh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 281 days.

(21) Appl. No.: 12/513,891

(22) PCT Filed: Nov. 9, 2007

(86) PCT No.: PCT/JP2007/071827
§ 371 (c)(1),
(2), (4) Date: May 7, 2009

(87) PCT Pub. No.: WO2008/056784
PCT Pub. Date: May 15, 2008

(65) Prior Publication Data
US 2010/0046360 A1    Feb. 25, 2010

(30) Foreign Application Priority Data

Nov. 10, 2006   (JP) .................................. 2006-305147

(51) Int. Cl.
*H04J 3/06* (2006.01)
(52) U.S. Cl. .................... 370/350; 370/503; 370/514
(58) Field of Classification Search .................. 370/350, 370/503, 514
See application file for complete search history.

(56) References Cited

U.S. PATENT DOCUMENTS

| | | | |
|---|---|---|---|
| 5,732,113 A * | 3/1998 | Schmidl et al. | 375/355 |
| 6,204,781 B1 * | 3/2001 | Aziz et al. | 341/59 |
| 2003/0179698 A1 * | 9/2003 | Lu | 370/209 |
| 2005/0207506 A1 | 9/2005 | Iwami | |
| 2007/0183391 A1 * | 8/2007 | Akita et al. | 370/350 |
| 2007/0280098 A1 * | 12/2007 | Bhatt et al. | 370/208 |
| 2008/0310567 A1 * | 12/2008 | Popovic | 375/354 |
| 2010/0166089 A1 * | 7/2010 | Seki | 375/260 |

FOREIGN PATENT DOCUMENTS

| | | |
|---|---|---|
| JP | 11-145929 A | 5/1999 |
| JP | 2001-53713 A | 2/2001 |
| WO | WO-2006/134829 A1 | 12/2006 |

OTHER PUBLICATIONS

R1-051329., "Cell Search and Initial Acquisition for OFDM Downlink", 3GPP TSG RAN WG1 #43 on LTE, Seoul, Korea, Nov. 7-11, 2005, pp. 1-7.
Tachikawa., "W-CDMA mobile communication system", ISBN4-621-04894-5, Maruzen Co., Ltd., Jun. 25, 2002, pp. 35-45.
3GPP TR (Technical Report) 25.814, V1.5.0 (May 2006), "Physical Layer Aspects for Evolved UTRA" Release 7, pp. 40-43.
Popovic., "Generalized Chirp-like Polyphase Sequences with Optimal Correlation Properties", IEEE Transactions Information Theory, vol. 38, No. 4, Jul. 1992, pp. 1406-1409.

* cited by examiner

*Primary Examiner* — Andrew Lee
(74) *Attorney, Agent, or Firm* — Birch, Stewart, Kolasch & Birch, LLP

(57) ABSTRACT

In a wireless communication method, a base station device allocates elements of a sequence having an index indicative of a communication parameter to synchronization channel symbols generates a synchronization channel while maintaining symmetry of the sequence, and transmits signals including the synchronization channel. A mobile station device restores synchronization of the signals which are faded corrects the signals based on the symmetry of the sequence, and extracts the communication parameter.

10 Claims, 24 Drawing Sheets

FIG. 1

| k | $s_k$ |
|---|---|
| 0 | $\exp(-j2\pi \times 0/32)$ |
| 1 | $\exp(-j2\pi \times 3/32)$ |
| 2 | $\exp(-j2\pi \times 12/32)$ |
| 3 | $\exp(-j2\pi \times 27/32)$ |
| 4 | $\exp(-j2\pi \times 48/32) = \exp(-j2\pi \times 16/32)$ |
| 5 | $\exp(-j2\pi \times 75/32) = \exp(-j2\pi \times 11/32)$ |
| 6 | $\exp(-j2\pi \times 108/32) = \exp(-j2\pi \times 12/32)$ |
| 7 | $\exp(-j2\pi \times 147/32) = \exp(-j2\pi \times 19/32)$ |
| 8 | $\exp(-j2\pi \times 192/32) = \exp(-j2\pi \times 0/32)$ |
| 9 | $\exp(-j2\pi \times 243/32) = \exp(-j2\pi \times 19/32)$ |
| 10 | $\exp(-j2\pi \times 300/32) = \exp(-j2\pi \times 12/32)$ |
| 11 | $\exp(-j2\pi \times 363/32) = \exp(-j2\pi \times 11/32)$ |
| 12 | $\exp(-j2\pi \times 432/32) = \exp(-j2\pi \times 16/32)$ |
| 13 | $\exp(-j2\pi \times 507/32) = \exp(-j2\pi \times 27/32)$ |
| 14 | $\exp(-j2\pi \times 588/32) = \exp(-j2\pi \times 12/32)$ |
| 15 | $\exp(-j2\pi \times 675/32) = \exp(-j2\pi \times 3/32)$ |

FIG. 2

| k | $s_k$ |
|---|---|
| 0 | $\exp(-j2\pi \times 0/32)$ |
| 1 | $\exp(-j2\pi \times 27/32)$ |
| 2 | $\exp(-j2\pi \times 60/32) = \exp(-j2\pi \times 28/32)$ |
| 3 | $\exp(-j2\pi \times 99/32) = \exp(-j2\pi \times 3/32)$ |
| 4 | $\exp(-j2\pi \times 144/32) = \exp(-j2\pi \times 16/32)$ |
| 5 | $\exp(-j2\pi \times 195/32) = \exp(-j2\pi \times 3/32)$ |
| 6 | $\exp(-j2\pi \times 252/32) = \exp(-j2\pi \times 28/32)$ |
| 7 | $\exp(-j2\pi \times 315/32) = \exp(-j2\pi \times 27/32)$ |
| 8 | $\exp(-j2\pi \times 384/32) = \exp(-j2\pi \times 0/32)$ |
| 9 | $\exp(-j2\pi \times 459/32) = \exp(-j2\pi \times 11/32)$ |
| 10 | $\exp(-j2\pi \times 540/32) = \exp(-j2\pi \times 28/32)$ |
| 11 | $\exp(-j2\pi \times 627/32) = \exp(-j2\pi \times 19/32)$ |
| 12 | $\exp(-j2\pi \times 720/32) = \exp(-j2\pi \times 16/32)$ |
| 13 | $\exp(-j2\pi \times 819/32) = \exp(-j2\pi \times 19/32)$ |
| 14 | $\exp(-j2\pi \times 924/32) = \exp(-j2\pi \times 28/32)$ |
| 15 | $\exp(-j2\pi \times 1035/32) = \exp(-j2\pi \times 11/32)$ |

FIG. 3

| k | $s_k$ |
|---|---|
| 0 | $\exp(-j2\pi \times 0/34)$ |
| 1 | $\exp(-j2\pi \times 6/34)$ |
| 2 | $\exp(-j2\pi \times 18/34)$ |
| 3 | $\exp(-j2\pi \times 36/34) = \exp(-j2\pi \times 2/34)$ |
| 4 | $\exp(-j2\pi \times 60/34) = \exp(-j2\pi \times 26/34)$ |
| 5 | $\exp(-j2\pi \times 90/34) = \exp(-j2\pi \times 22/34)$ |
| 6 | $\exp(-j2\pi \times 126/34) = \exp(-j2\pi \times 24/34)$ |
| 7 | $\exp(-j2\pi \times 168/34) = \exp(-j2\pi \times 32/34)$ |
| 8 | $\exp(-j2\pi \times 216/34) = \exp(-j2\pi \times 12/34)$ |
| 9 | $\exp(-j2\pi \times 270/34) = \exp(-j2\pi \times 32/34)$ |
| 10 | $\exp(-j2\pi \times 330/34) = \exp(-j2\pi \times 24/34)$ |
| 11 | $\exp(-j2\pi \times 396/34) = \exp(-j2\pi \times 22/34)$ |
| 12 | $\exp(-j2\pi \times 468/34) = \exp(-j2\pi \times 26/34)$ |
| 13 | $\exp(-j2\pi \times 546/34) = \exp(-j2\pi \times 2/34)$ |
| 14 | $\exp(-j2\pi \times 630/34) = \exp(-j2\pi \times 18/34)$ |
| 15 | $\exp(-j2\pi \times 720/34) = \exp(-j2\pi \times 6/34)$ |
| 16 | $\exp(-j2\pi \times 816/34) = \exp(-j2\pi \times 0/34)$ |

FIG. 4

| k | $s_k$ |
|---|---|
| 0 | $\exp(-j2\pi \times 0/34)$ |
| 1 | $\exp(-j2\pi \times -42/34) = \exp(-j2\pi \times 26/34)$ |
| 2 | $\exp(-j2\pi \times -70/34) = \exp(-j2\pi \times 32/34)$ |
| 3 | $\exp(-j2\pi \times -84/34) = \exp(-j2\pi \times 18/34)$ |
| 4 | $\exp(-j2\pi \times -84/34) = \exp(-j2\pi \times 18/34)$ |
| 5 | $\exp(-j2\pi \times -70/34) = \exp(-j2\pi \times 32/34)$ |
| 6 | $\exp(-j2\pi \times -42/34) = \exp(-j2\pi \times 26/34)$ |
| 7 | $\exp(-j2\pi \times 0/34)$ |
| 8 | $\exp(-j2\pi \times 56/34) = \exp(-j2\pi \times 22/34)$ |
| 9 | $\exp(-j2\pi \times 126/34) = \exp(-j2\pi \times 24/34)$ |
| 10 | $\exp(-j2\pi \times 210/34) = \exp(-j2\pi \times 6/34)$ |
| 11 | $\exp(-j2\pi \times 308/34) = \exp(-j2\pi \times 2/34)$ |
| 12 | $\exp(-j2\pi \times 420/34) = \exp(-j2\pi \times 12/34)$ |
| 13 | $\exp(-j2\pi \times 546/34) = \exp(-j2\pi \times 2/34)$ |
| 14 | $\exp(-j2\pi \times 686/34) = \exp(-j2\pi \times 6/34)$ |
| 15 | $\exp(-j2\pi \times 840/34) = \exp(-j2\pi \times 24/34)$ |
| 16 | $\exp(-j2\pi \times 1008/34) = \exp(-j2\pi \times 22/34)$ |

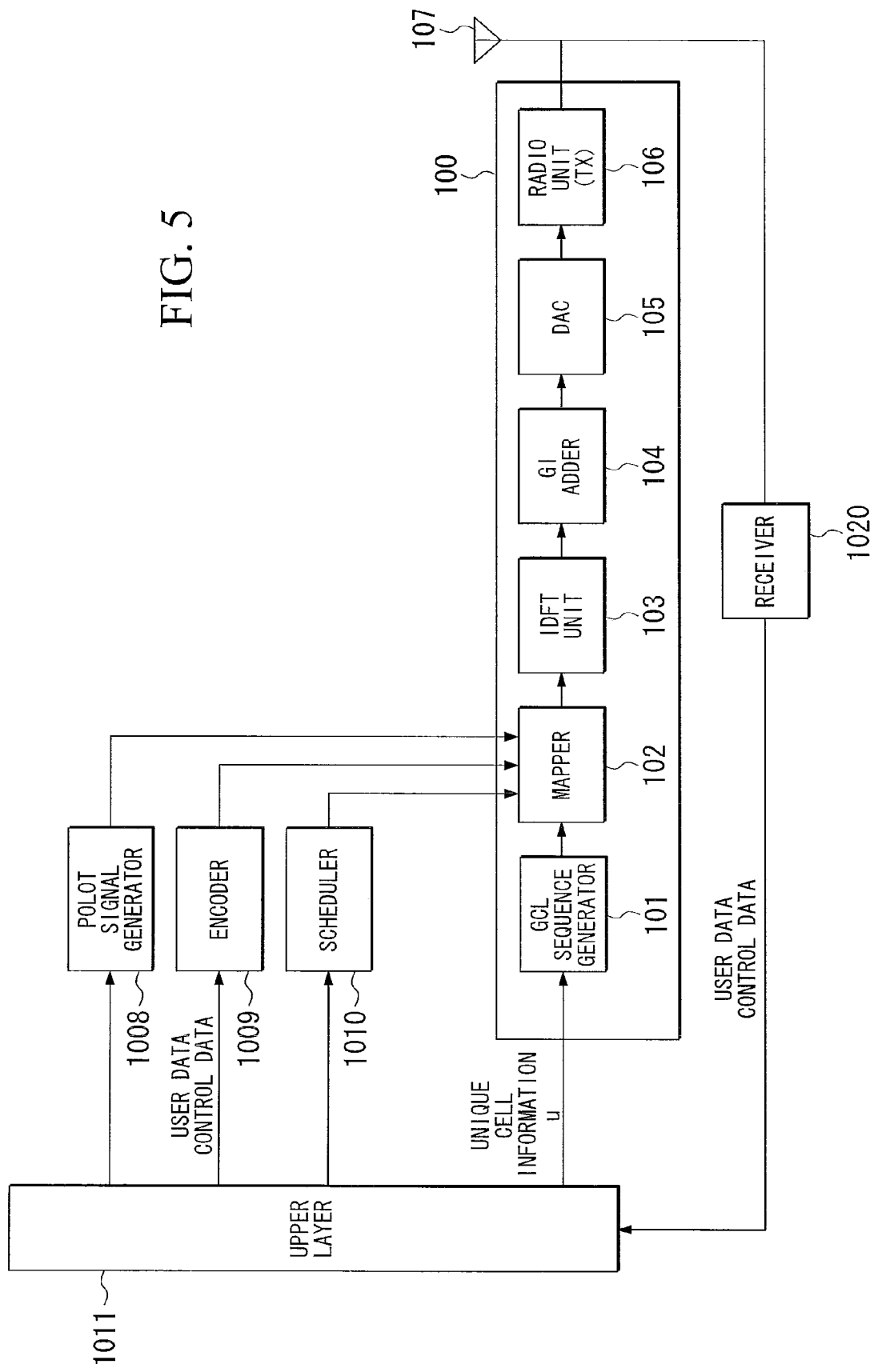

WIRELESS COMMUNICATION METHOD, RECEIVING METHOD, AND WIRELESS COMMUNICATION DEVICE

TECHNICAL FIELD

The present invention relates to a wireless communication method, a receiving method, and a wireless communication device. Particularly, the present invention relates to a wireless communication method, a receiving method, and a wireless communication device for obtaining information concerning communication parameters from a synchronization channel using a GCL sequence.

Priority is claimed on Japanese Patent Application No. 2006-305147, filed Nov. 10, 2006, the content of which is incorporated herein by reference.

BACKGROUND ART

Recently, W-CDMA (Wideband-Code Division Multiple Access, see Non-Patent Document 1) defined as RAT (Radio Access Technology) that is radio access technology by 3GPP (3rd Generation Partnership Project) has been standardized as a third generation cellular mobile communication system, and services thereof have sequentially been provided. Additionally, EUTRA (Evolved Universal Terrestrial Radio Access) and EUTRAN (Evolved Universal Terrestrial Radio Access Network) have been under consideration. In EUTRA, OFDMA (Orthogonal Frequency Division Multiple Access) has been proposed as a communication scheme (see Non-Patent Document 2).

In cellular mobile communication systems, mobile station devices included in a cell or a sector, which is a communication area served by a base station device, have to be wirelessly synchronized with the base station device in advance. For this reason, the base station device transmits SCH (Synchronization Channel) having a given structure so that the base station device detects the SCH to be synchronized with the base station. In W-CDMA, P-SCH (Primary SCH) and S-SCH (Secondary SCH) are transmitted as SCH in the same timing. The mobile station device achieves slot synchronization by P-SCH and frame synchronization by a transmission pattern of S-SCH, and specifies a cell ID group for identifying the base station device. Further, CPICH (Common Pilot Channel) is used to identify a cell ID of the base station device from the cell ID group (see "2-2-2. Cell Search" on pages 35-45 of Non-Patent Document 1).

A series of the above control, i.e., control by the mobile station device wirelessly synchronizing the base station device and then specifying the cell ID of the base station device, is called cell search. The cell search can be classified into initial cell search and neighboring cell search. The initial cell search is cell search for a mobile station device to search the nearest cell to stay therein after the mobile station device is powered on. The neighboring cell search is cell search for the base station device to search a candidate cell to be a handover destination after the initial cell search.

Although EUTRA is multi-carrier communication using OFDMA and therefore uses SCH, it is known that control different from cell search in W-CDMA is necessary. For example, base station devices having different band widths (for example, 1.25 MHz, 2.5 MHz, 5 MHz, 10 MHz, and 20 MHz) have to be supported for coexistence between 2G and 3G services in EUTRA. In consideration of this, a method of performing transmission in the center of the frequency bandwidth of the base station where a frequency bandwidth of SCH is 1.25 MHz has been proposed (see Non-Patent Document 2). FIG. 20 illustrates the relationship between SCH and different frequency bands B1 to B5 of base station devices. In other words, it shows the case where base station devices have frequency bands B1=20 MHz, B2=10 MHz, B3=5 MHz, B4=2.5 MHz, and B5=1.25 MHz, and SCH is allocated in the center of each of the frequency bands of the base station devices. As shown in FIG. 20, SCH is always transmitted in the center of each of the frequency bands of the base station devices even if the base station devices have different frequency bandwidths. Accordingly, even if a neighboring base station device has a different frequency bandwidth from that of the current base station device, the mobile station device can detect SCH by performing neighboring cell search in the center of the frequency band.

An SCH structure using GCL (Generalized Chirp Like) sequence has been proposed in 3GPP (see Non-Patent Document 3). According to Non-Patent Document 4, GCL sequence $s_k$ is defined as Expression (1).

$$S_k = a_k b_{(k) \bmod m}, \ k = 0, \ldots, N-1 \qquad (1)$$

where "(k) mod m" denotes a remainder when k is divided by m. Further, $a_k$ can be expressed as Expression (2).

$$a_k = \begin{cases} W_N^{k^2/2 + qk} & \text{(IF } N \text{ IS EVEN)} \\ W_N^{k(k+1)/2 + qk} & \text{(IF } N \text{ IS ODD)} \end{cases} \qquad (2)$$

where q is an integer and $W_n = \exp(-j2\pi r/n)$ where j is an imaginary unit, r is a GCL sequence index and an integer coprime to n.

$b_i$ (i=0, ..., m−1) is a complex number whose amplitude (absolute value) is 1. GCL sequence disclosed in Non-Patent Document 3 is GCL sequence $s_k$ when $b_i$=1, q=0, and N is a prime number, which is expressed by Expression (3).

$$s_k = \exp\left(-2\pi u \frac{k(k+1)}{2N}\right) \qquad (3)$$

where k=0, ..., N−1, u=1, ..., N−1, and u denotes a GCL sequence index (corresponding to r in Expression (2)). A value of the GCL sequence index u corresponds to unique cell information and can indicate unique cell information. The unique cell information includes a cell or sector index (cell/sector ID, or cell/sector number), the number of transmission antennas included in a cell or a sector, the length of a GI (Guard Interval), a frequency bandwidth of BCH (Broadcast Channel), timing of a first wireless frame, system parameters of a cell or a sector, and the like.

Hereinafter, a cell search method disclosed in Non-Patent Document 3 is explained. FIG. 21 is a schematic block diagram illustrating the configuration of an SCH transmitter 1000 included in a base station device. As shown in FIG. 21, the SCH transmitter 1000 includes: a GCL sequence generator 1001 that generates GCL sequence having u as a GCL sequence index based on the unique cell information u; a mapper 1002 that maps the generated GCL sequence to a frequency axis; an IDFT (Inverse Discrete Fourier Transform) unit 1003 that performs an inverse Fourier transform to convert the mapped signal into a time domain signal; a GI adder 1004 that adds a guard interval to the converted time domain signal; a DAC (Digital to Analogue Converter) 1005 that converts the digital signal with the GI added into an analog signal; and a radio unit (TX) 1006 that transmits the analog signal on a carrier of a given frequency through an antenna 1007.

The GCL sequence generator 1001 generates GCL sequence s based on Expression (3) and the unique cell information u. The mapper 1002 maps respective elements $s_0, \ldots, s_{N-1}$ of the generated GCL sequence s onto subcarriers on the frequency axis. At this time, respective elements of the GCL sequence s are mapped onto even-numbered subcarriers (subcarrier 2, subcarrier 4, . . . , subcarrier 2N) as shown in FIG. 22, null signals (signals having the power level 0) are mapped onto subcarrier 0 and odd-numbered subcarriers. Thereby, the time domain signal subjected to the IDFT by the IDFT unit 1003 becomes a repetition of the same signal.

FIG. 23 is a schematic block diagram illustrating the configuration of a cell search unit included in the mobile station device. As shown in FIG. 23, the cell search unit includes: a radio unit (RX) 1101 that receives a signal transmitted from the base station device through an antenna 1110; an ADC (Analogue to Digital Converter) 1102 that converts the analog signal received by the radio unit into a digital signal; an SCH symbol timing detector 1103 that detects SCH symbol timing using a time domain signal converted into the digital signal; a DFT (Discrete Fourier Transform) unit 1104 that performs a Fourier transform to convert the time domain signal output from the ADC 1102 into a frequency domain signal based on information concerning the SCH symbol timing detected by the SCH symbol timing detector 1103; a GCL sequence acquirer 1105 that acquires GCL sequence s' from the signal subjected to the DFT; a differential encoder 1106 that performs differential coding on information concerning phase of the acquired GCL sequence s'; an IDFT unit 1107 that performs an inverse Fourier transform on the signal encoded by the differential encoder 1106; a peak power calculator 1108 that calculates the peak power level of the signal output from the IDFT unit 1107; and a unique cell information estimator 1109 that estimates a GCL sequence index u of the GCL sequence s' based on the IDFT index number corresponding to the peak power level and outputs a value of the estimated u as unique cell information.

As shown in FIG. 22, the time domain SCH signal is a repetition of the same signal as explained above. The SCH symbol timing detector 1103 estimates SCH symbol timing by detecting the peak of correlation values between a reception signal and a reception signal delayed by a half symbol. The DFT unit 1104 performs a Fourier transform in the estimated symbol timing to acquire a frequency domain signal of SCH. The GCL sequence acquirer 1105 can acquire GCL sequence s' by extracting signals of even-numbered subcarriers. The differential encoder 1106 performs differential coding on information concerning the phase of the GCL sequence s'. In other words, the differential encoder 1106 outputs a sequence including elements obtained by subtracting anterior elements $s'_{k-1}$ from elements $s'_k$ each included in the GCL sequence s'.

The IDFT unit 1107 performs an N-point inverse Fourier transform on the sequence including N elements output from the differential encoder 1106 to generate a time domain signal. The peak power calculator 1108 calculates power levels of the signals which correspond to the indexes 0 to N−1 and are generated by the IDFT unit 1107. The unique cell information estimator 1109 detects, from the calculated power levels, an impulse (peak power level) corresponding only to an index u uniquely defined by the GCL sequence index u of the GCL sequence s', and outputs the index u as unique cell information u. However, an impulse does not occur due to the effect of noises or signals transmitted from other base stations. Therefore, the unique cell information estimator 1109 estimates unique cell information u by detecting the index corresponding to the maximum power level among power levels of indexes.

Thus, wireless synchronization and identification of the cell ID (estimation of unique cell information u) can be achieved.

[Non-Patent Document 1] Keiji Tachikawa, "W-CDMA mobile communication system", ISBN4-621-04894-5, first published on Jun. 25, 2002 by Maruzen Co., Ltd.

[Non-Patent Document 2] 3GPP TR (Technical Report) 25.814, V1.5.0 (2006-5), "Physical Layer Aspects for Evolved UTRA", [online], <URL: http://www.3 gpp.org/ftp/Specs/html-info/25814.htm>

[Non-Patent Document 3] R1-051329 "Cell Search and Initial Acquisition for OFDM Downlink" 3GPP TSG RAN WG1 #43 on LTE Seoul, Korea, Nov. 7-11, 2005, [online], <URL: http://www.3gpp.org/ftp/tsg_ran/WG1_RL1/TSGR1_43/Docs/R1-051329.zip>

[Non-Patent Document 4] B. M. Popovic, "Generalized Chirp-like Polyphase Sequences with Optimal Correlation Properties", IEEE Trans. Info. Theory, vol. 38, pp. 1406-1409, July 1992

DISCLOSURE OF THE INVENTION

Problems to be Solved by the Invention

With respect to SCH using the GCL sequence, the unique cell information u is obtained based on signals over the entire band of the SCH. The detection probability of unique cell information degrades when a reception condition of a part of the band is deteriorated due to the effect of noises, interferences, or channels.

In order for a mobile station device that is in communication using a band other than the SCH and therefore can receive only signals in a partial band of SCH to perform neighboring cell search, the mobile station device has to suspend the communication to change the setting of reception frequency so that signals over the entire band of the SCH can be received.

Means for Solving the Problems

A wireless communication method of the present invention includes: allocating, by a base station device, elements of a sequence having an index indicative of a communication parameter to synchronization channel symbols; generating, by the base station device, a synchronization channel while maintaining symmetry of the sequence; transmitting, by the base station device, signals including the synchronization channel; restoring, by a mobile station device, synchronization of the signals which are faded; correcting, by the mobile station device, the signals based on the symmetry of the sequence; and extracting, by the mobile station device, the communication parameter.

A receiving method of the present invention is provided for a wireless communication device to receive signals including a synchronization channel to which elements of a sequence having an index indicative of a communication parameter are allocated as synchronization channel symbols while symmetry of the sequence is maintained. The receiving method includes: restoring synchronization of the signals which are faded; correcting the signals based on the symmetry of the sequence; and extracting the communication parameter.

A wireless communication method of the present invention includes: allocating, by a base station device, elements of a sequence having an index indicative of a communication parameter to synchronization channel symbols; generating, by the base station device, a synchronization channel while maintaining symmetry of the sequence; transmitting, by the base station device, signals including the synchronization channel; receiving, by a mobile station device, the signals which are faded and have a half frequency band of the synchronization channel; restoring, by the mobile station device, synchronization of the signals received; interpolating, by the mobile station device, a remaining half of the synchronization channel based on the symmetry of the sequence; and extracting, by the mobile station device, the communication parameter.

A receiving method of the present invention is provided for a wireless communication device to receive signals including a synchronization channel to which elements of a sequence having an index indicative of a communication parameter are allocated as synchronization channel symbols while symmetry of the sequence is maintained. The receiving method includes: receiving the signals which are faded and have a half frequency band of the synchronization channel; restoring synchronization of the signals received; interpolating a remaining half of the synchronization channel based on the symmetry of the sequence; and extracting the communication parameter.

A wireless communication device of the present invention receives a synchronization channel to which elements of a sequence having an index indicative of a communication parameter are allocated as synchronization channel symbols while symmetry of the sequence is maintained, and detects the communication parameter. The wireless communication device includes: a synchronization channel detector that detects the synchronization channel from received signals; a Fourier transformer that performs a Fourier transform on the synchronization channel to output the synchronization channel symbols; a symbol corrector that corrects the synchronization channel symbols based on the symmetry of the sequence; and an index detector that detects the index of the sequence based on the synchronization channel symbols corrected.

Accordingly, the wireless communication device corrects the synchronization channel symbols based on the symmetry of the sequence, and thereby can detect useful communication parameter with the effects of noises or channels reduced.

In the wireless communication device, the symbol corrector divides the synchronization channel symbols into two groups based on the symmetry of the sequence and generates, based on one of the two groups which is in better reception condition, the other group of synchronization channel symbols to correct the synchronization channel symbols.

In the wireless communication device, the symbol corrector compares two of the synchronization channel symbols which are in symmetric relationship with each other based on the symmetry of the sequence, and corrects one of the two synchronization channel symbols by substituting the one of the two synchronization channel symbols with the other of the two synchronization channel symbols which is in a better reception condition as a result of the comparison.

In the wireless communication device, the symbol corrector corrects one of two synchronization channel symbols in symmetric relation with each other based on the symmetry of the sequence by adding the other of the two synchronization channel symbols to the one of the two synchronization channel symbols.

A wireless communication device of the present invention receives signals in a half frequency band of a synchronization channel to which elements of a sequence having an index indicative of a communication parameter are allocated as synchronization channel symbols while symmetry of the sequence is maintained, and detects the communication parameter. The wireless communication device includes: a synchronization channel detector that detects the synchronization channel from the signals received; a Fourier transformer that performs a Fourier transform on the synchronization channel to output the synchronization channel symbols; a symbol interpolator that interpolates synchronization channel symbols in a remaining half of the frequency band based on the symmetry of the sequence; and an index detector that detects the index of the sequence based on the synchronization channel symbols interpolated.

Accordingly, the wireless communication device of the present invention interpolates the synchronization channel symbols based on the symmetry of the sequence, and thereby can detect the communication parameter by receiving the half band of the synchronization channel.

Effects of the Invention

The wireless communication device of the present invention performs correction based on symmetry of the sequence on SCH symbols, and thereby can detect information concerning useful communication parameters less affected by the effects of noises, channels, or the like.

Additionally, the wireless communication device of the present invention performs interpolation based on the symmetry of the sequence on SCH symbols, and thereby can detect information concerning communication parameters by receiving signals over a half band of the SCH.

BRIEF DESCRIPTION OF THE DRAWINGS

FIG. 1 is a chart illustrating values of GCL sequence $s_k$ where N=16, r=3, q=0.

FIG. 2 is a chart illustrating values of GCL sequence $s_k$ where N=16, r=3, q=4.

FIG. 3 is a chart illustrating values of GCL sequence $s_k$ where N=17, r=3, q=0.

FIG. 4 is a chart illustrating values of GCL sequence $s_k$ where N=17, r=7, q=4.

FIG. 5 is a schematic block diagram illustrating the configuration of a base station device according to a first embodiment of the present invention.

Figure 6A:
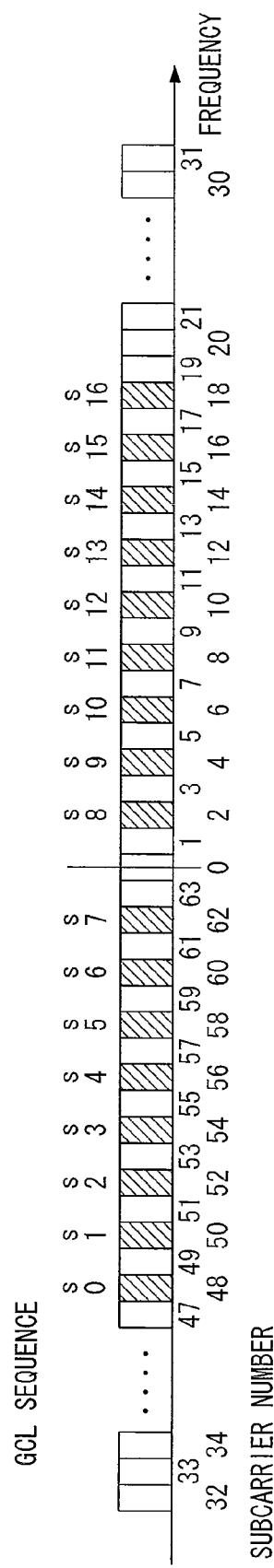
FIG. 6A illustrates mapping of GCK sequence $s_k$ to subcarriers performed by a mapper 102 according to the first embodiment.

DESCRIPTION OF REFERENCE NUMERALS 100, 500, and 1000 SCH transmitter
101 and 1001 GCL sequence generator
102, 502, and 1002 mapper
103 and 1003 IDFT unit
104 and 1004 GI adder
105 and 1005 DAC
106 and 1006 radio unit
107, 220, 1007, and 1110 antenna
200, 300, 400, 600, and 1100 cell search unit
201, 601, and 1101 radio unit
202 and 1102 ADC
203 and 1103 SCH symbol timing detector
204 and 1104 DFT unit
205 and 1105 GCL sequence acquirer
206 and 1106 differential encoder
207 and 1107 IDFT unit
208 and 1108 peak power calculator
209 and 1109 unique cell information estimator
210, 310, 410, and 610 GCL sequence corrector
211 and 411 divider
212 and 213 power calculator
214 comparator
215, 412, and 413 substituting unit
311-0 to 311-16 power calculator
312-1 to 312-8 comparator
313-1 to 313-8 duplicator
414 adder
611 data generator
1008 pilot signal generator
1009 encoder
1010 scheduler
1020 receiver
1011 upper layer
1111 data demodulator
1112 scheduler
1113 user data processor
1114 control data processor
1115 pilot signal processor
1116 upper layer
1200 transmitter

BEST MODE FOR CARRYING OUT THE INVENTION

Before explaining embodiments, symmetry of GCL sequence $s_k$ is explained hereinafter. As explained above, GCL sequence $s_k$ is a sequence generally expressed as Expression (1). If it is assumed that $b_i=1$ (i=0, ..., m-1), GCL sequence $s_k$ in Expression (1) can be expressed as Expression (4).

$$s_k = \begin{cases} \exp\left(-j2\pi r \frac{k^2 + 2qk}{2N}\right) & \text{(IF } N \text{ IS EVEN)} \\ \exp\left(-j2\pi r \frac{k(k+1) + 2qk}{2N}\right) & \text{(IF } N \text{ IS ODD)} \end{cases} \quad (4)$$

If N is even, the followings are assumed.

$$q' = \begin{cases} q \bmod \frac{N}{2} & (q \geq 0) \\ \left(q \bmod \frac{N}{2}\right) - \frac{N}{2} & (q < 0) \end{cases} \quad (5)$$

$$a = 0, \ldots, N/2$$

$$k'_1 = \frac{N}{2} - q' + a$$

$$k_1 = \begin{cases} k'_1 + N & (k'_1 < 0) \\ k'_1 & (0 \leq k'_1 < N) \\ k'_1 - N & (N \leq k'_1) \end{cases}$$

$$k'_2 = \frac{N}{2} - q' - a \quad (6)$$

$$k_2 = \begin{cases} k'_2 + N & (k'_2 < 0) \\ k'_2 & (0 \leq k'_2 < N) \\ k'_2 - N & (N \leq k'_2) \end{cases}$$

If a result obtained by substituting $k_1$ in Expression (5) into Expression (4) and a result obtained by substituting $k_2$ in Expression (6) into Expression (4) are compared, $s_{k1}=s_{k2}$, which indicates that values of two elements of the GCL sequence $s_k$ in Expression (4) (equal to $a_k$ in Expression (1)) symmetric to k=N/2−q' are equal if N is even.

For example, FIG. 1 is a chart illustrating values of GCL sequence $s_k$ where N=16, r=3, q=0 in Expression (4). As can be understood from FIG. 1, $s_8=s_8$, $s_7=s_9$, $s_6=s_{10}$, ..., $s_1=s_{15}$, $s_0=s_0$ with k=N/2−q=8 as the center, i.e., values of two elements symmetric to the center k=8 are equal. Accordingly, $s_0$, $s_1$, ..., $s_{15}$ can be calculated using $s_0$, $s_1$, ..., $s_8$ or $s_8$, $s_9$, ..., $s_{15}$, $s_0$.

FIG. 2 is a chart illustrating values of the GCL sequence $s_k$ where N=116, r=3, q=4 in Expression (4). As can be understood from FIG. 2, similar to FIG. 1, $s_4=s_4$, $s_3=s_5$, $s_2=s_6$, $s_1=s_7$, $s_0=s_8$, $s_{15}=s_9$, ..., $s_{13}=s_{11}$, $s_{12}=s_{12}$ with k=N/2−(q mod N/2)=8−4=4 as the center.

If N is odd in Expression (4), the followings are assumed.

$$q' = \begin{cases} q \bmod N & (q \geq 0) \\ (q \bmod N) - N & (q < 0) \end{cases} \quad (7)$$

$$a = 0, \ldots, (N-1)/2$$

$$k'_1 = \frac{(N-1)}{2} - q' + a$$

$$k_1 = \begin{cases} k'_1 + N & (k'_1 < 0) \\ k'_1 & (0 \leq k'_1 < N) \\ k'_1 - N & (N \leq k'_1) \end{cases}$$

$$k'_2 = \frac{(N-1)}{2} - q' - a \quad (8)$$

$$k_2 = \begin{cases} k'_2 + N & (k'_2 < 0) \\ k'_2 & (0 \leq k'_2 < N) \\ k'_2 - N & (N \leq k'_2) \end{cases}$$

If a result obtained by substituting $k_1$ in Expression (7) into Expression (4) and a result obtained by substituting $k_2$ in Expression (8) into Expression (4) are compared, $s_{k1}=s_{k2}$, which indicates that values of two elements of the GCL sequence $s_k$ in Expression (4) (equal to $a_k$ in Expression (1)) symmetric to $k=(N-1)/2-q'$ are equal if N is odd.

For example, FIG. 3 is a chart illustrating values of GCL sequence $s_k$ where N=17, r=3, q=0 in Expression (4). As can be understood from FIG. 3, $s_8=s_8$, $s_7=s_9$, $s_6=s_{10}$, ..., $s_1=s_{15}$, $s_0=s_{16}$ with k=8 as the center, i.e., values of two elements symmetric to the center k=8 are equal. Accordingly, $s_0$, $s_1$, ..., $s_{16}$ can be calculated using $s_0$, $s_1$, ..., $s_8$ or $s_8$, $s_9$, ..., $s_{16}$.

FIG. 4 is a chart illustrating values of the GCL sequence $s_k$ where N=17, r=7, q=−4 in Expression (4). As can be understood from FIG. 4, $s_{12}=s_{12}$, $s_{11}=s_{13}$, $s_{10}=s_{14}$, $s_9=s_{15}$, $s_8=s_{16}$, $s_7=s_0$, $s_6=s_1$, $s_5=s_2$, $s_4=s_3$ with $k=(N-1)/2-q'=8-(13-17)=12$ as the center, i.e., values of two elements symmetric to the center k=12 are equal. Accordingly, $s_0$, $s_1$, ..., $s_{15}$ can be calculated using $s_4$, $s_3$, ..., $s_0$, $s_{15}$, $s_{14}$, ..., $s_{12}$ or $s_4$, $s_5$, ..., $s_{11}$, $s_{12}$.

Although the above explanation was given assuming $b_i=1$, the above relationship is true not for $s_k$, but for $a_k$ if $b_i$ is not 1. In other words, similar to FIG. 4 except for $b_i$, $a_0$, $a_1$, ..., $a_{15}$ can be calculated using $a_4$, $a_3$, ..., $a_0$, $a_{15}$, $a_{14}$, ..., $a_{12}$, or $a_4$, $a_5$, ..., $a_{11}$, $a_{12}$, when N=17, r=7, q=−4. Accordingly, if $b_i$ is known, $a_4$, $a_3$, ..., $a_0$, $a_{15}$ $a_{14}$, ..., $a_{12}$ can be calculated by complex division of a reception signal by $b_i$. Thereby, $s_0$, $s_1$, ..., $s_{15}$ can be calculated by complex multiplication of $b_i$ to $a_0$, $a_1$, ..., $a_{15}$. If $b_i$ is known, similar processing can be applied to the other cases (FIGS. 1 to 3). The same can apply to each of embodiments explained hereinafter.

The present invention relates to a wireless communication device and a receiving method for acquiring information concerning communication parameters from SCH. The following embodiments explain, as an example of the wireless communication system and the receiving method, a mobile communication system in which a base station device transmits SCH where respective elements of GCL sequence having a GCL index corresponding to unique cell information concerning the base station device as an example of information concerning communication parameters are allocated to SCH symbols, and a mobile station device as an example of the wireless communication device efficiently identifies the unique cell information u using the aforementioned method.

First Embodiment

Hereinafter, a base station device and a mobile station device included in a mobile communication system according to a first embodiment of the present invention are explained with reference to accompanying drawings. FIG. 5 is a schematic block diagram illustrating the configuration of the base station device according to the first embodiment. Reference numeral 1011 denotes an upper layer that performs overall control of all units included in the base station device. Reference numeral 1008 denotes a pilot signal generator that generates a pilot signal. Reference numeral 1009 denotes an encoder that receives and encodes user data and control data with a transmission request from the upper layer 1011 as a trigger. Reference numeral 1010 denotes a scheduler that outputs scheduling information concerning each signal based on an instruction from the upper layer 1011. Reference numeral 1020 denotes a receiver that receives user data and control data from a signal received through an antenna 107 and outputs the received data to the upper layer 1011.

Reference numeral 101 denotes a GCL sequence generator that calculates a GCL sequence $s_k$ (k=0, ..., 16) based on unique cell information u received from the upper layer 1011. The GCL sequence to be used by the GCL sequence generator 101 is assumed to be $s_k$ in Expression (1) where $b_i=1$, q=0, N=17. Reference numeral 102 denotes a mapper that maps outputs from the encoder 1009, the pilot signal generator 1008, and the GCL sequence generator 101 onto subcarriers based on scheduling information received from the scheduler 1010. The mapper 102 maps respective elements of the GCL sequence $s_k$ calculated by the GCL sequence generator 101 onto even-numbered subcarriers on the frequency axis as SCH symbols. For example, the GCL sequence generator 101 maps $s_0$ to subcarrier 48, $s_1$ to subcarrier 50, ..., $s_7$ to subcarrier 62, $s_8$ to subcarrier 2, $s_9$ to subcarrier 4, ..., $s_{16}$ to subcarrier 18, as shown in FIG. 6A.

Reference numeral 103 denotes an IDFT unit that performs a 64-point IDFT to convert the signal mapped onto the subcarriers into a time domain signal. Reference numeral 104 denotes a GI adder that adds a guard interval to the time domain signal. Reference numeral 105 denotes a DAC that converts the digital signal with the guard interval added into an analog signal. Reference numeral 106 denotes a radio unit (TX) that transmits the analog signal at a given frequency through the antenna 107. In the first embodiment, a unit including the GCL sequence generator 101, the mapper 102, the IDFT unit 103, the GI adder 104, the DAC 105, and the radio unit (TX) 106 is called an SCH transmitter 100.

Figure 7:
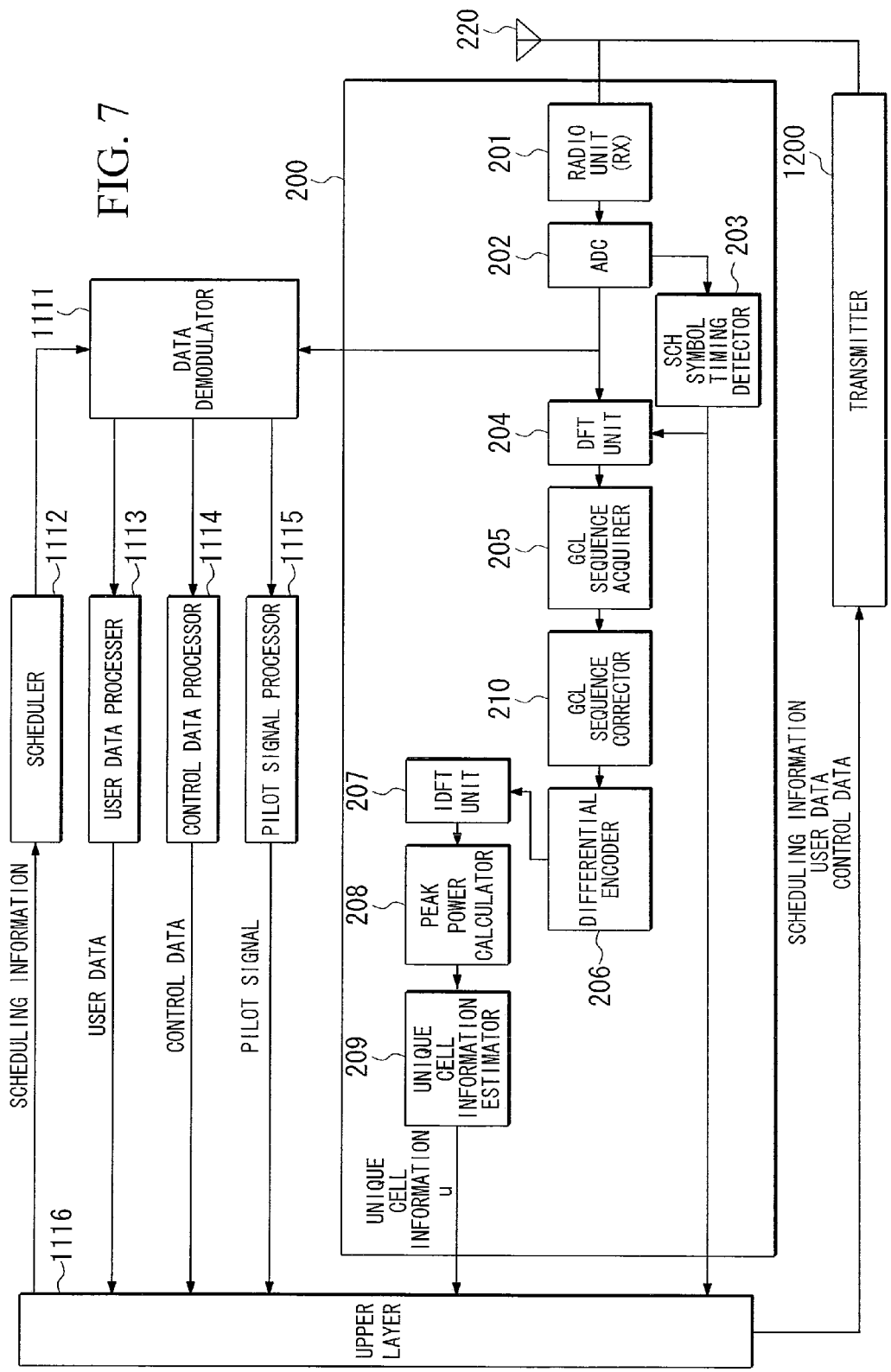
FIG. 7 is a schematic block diagram illustrating the configuration of a mobile station device according to the first embodiment.

FIG. 7 is a schematic block diagram illustrating the configuration of a mobile station device. Reference numeral 201 denotes a radio unit (RX) that receives a signal transmitted from a base station device through an antenna 220. Reference numeral 202 denotes an ADC that converts the analog signal received by the radio unit 201 into a digital signal. Reference numeral 203 denotes an SCH symbol timing detector (synchronization channel detector) that detects SCH symbol timing using the time domain signal converted into the digital signal. Reference numeral 204 denotes a DFT (Discrete Fourier transformer) that performs DFT (Discrete Fourier Transform) to convert the time domain signal output from the ADC 202 into a frequency domain signal based on the SCH symbol timing information detected by the SCH symbol timing detector. Reference numeral 205 denotes a GCL sequence acquirer that acquires GCL sequence from the signal subjected to the DFT.

Reference numeral 210 denotes a GCL sequence corrector (symbol corrector) that corrects the acquired GCL sequence based on symmetry thereof. The detail of the GCL sequence corrector 210 will be explained later. Reference numeral 206 denotes a differential encoder that performs differential coding on phase information concerning the GCL sequence corrected by the GCL sequence corrector. Reference numeral 207 denotes an IDFT (Inverse Discrete Fourier Transform) unit that performs IDFT on the signal encoded by the differential encoder 206. Reference numeral 208 denotes a peak power calculator that calculates the peak power level of the signal output from the IDFT unit 207. Reference numeral 209 denotes a unique cell information estimator that estimates and outputs unique cell information based on the IDFT index number corresponding to the peal power level. In the first embodiment, the differential encoder 206, the IDFT unit 207, the peak power calculator 208, and the unique cell information estimator 209 function as an index detector. Additionally, a unit including the radio unit (RX) 201, the ADC 202, the SCH symbol timing detector 203, the DFT unit 204, the GCL sequence acquirer 205, the differential encoder 206, the IDFT unit 207, the peak power calculator 208, and the unique cell information estimator 209 is called a cell search unit 200.

Reference numeral 1116 denotes an upper layer that performs overall control of all units included in the mobile station device. Reference numeral 1112 denotes a scheduler that instructs a data demodulator 1111 to demodulate each data using scheduling information received from the upper layer 1116. The data demodulator 1111 demodulates the signal output from the ADC 102 and outputs the demodulated signal to the user data processor 1113, the control data processor 1114, or the pilot signal processor 1115 according to the type of data obtained by the demodulation. The user data processor 1113 processes user data from the data demodulator 1111 to output the user data to the upper layer 1116. The control data processor 1114 processes control data from the data demodulator 1111 to output the control data to the upper layer 1116. The pilot signal processor 1115 processes a pilot signal from the data demodulator 1111 to output the pilot signal to the upper layer.

In the cell search unit 200 of the mobile station device, the ADC 202 converts a signal received through the radio unit 201 into a digital signal. Then, the SCH symbol timing detector 203 detects the peak of correlation between the reception signal and the reception signal delayed by a half symbol, and thereby estimates SCH symbol timing. The DFT unit 204 performs a Fourier transform in the symbol timing estimated by the SCH symbol timing detector 203 to acquire a frequency domain signal of SCH (SCH symbol). The GCL sequence acquirer 205 acquires GCL sequence $s_k$ by extracting signals of even-numbered subcarriers from the frequency domain signals of SCH acquired by the DFT unit 204. Then, the GCL sequence corrector 210 corrects the acquired $s_k$ based on symmetry of the GCL sequence.

Figure 8:
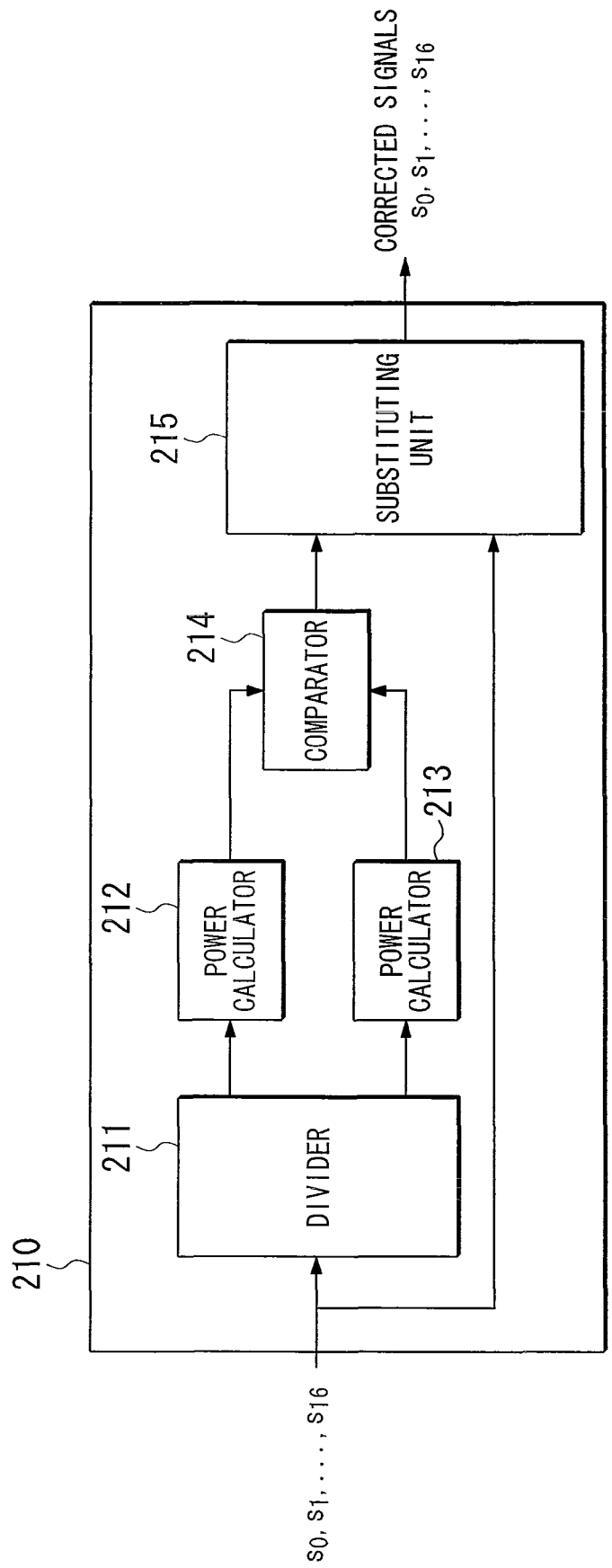
FIG. 8 is a schematic block diagram illustrating the inner configuration of a GCL sequence corrector 210 according to the first embodiment.

FIG. 8 is a schematic block diagram illustrating the inner configuration of the GCL sequence corrector 210. The GCL sequence corrector 210 includes: a divider 211 that selects two groups each including a single or multiple signals from input signals and outputs the selected signals; power calculators 212, 213 that calculate the total power level of multiple signals; a comparator 214 that compares outputs from the power calculators 212, 213; and a substituting unit 215 that substitutes $s_k$ based on the result of the comparison by the comparator.

The divider 211 generates two groups of $s_0, s_1, \ldots, s_7$ and $s_9, s_{10}, \ldots, s_{16}$ from the input $s_0, s_1, \ldots, s_{16}$, and outputs the former group to the power calculator 212 and the latter group to the power calculator 213. The divider 211 performs the grouping so that two signals symmetric to the center (N−1)/2−q' (where q'=q mod N for q≧0, or q'=(q mod N)−N for q<0) determined based on the parameters N, q used for the GCL sequence $s_k$ are grouped into different groups, and asymmetric signals adjacent to each other on the frequency axis are grouped into the same group. In the first embodiment, the center index is (N−1)/2−q'=(17−1)/2−0=8 since N=17 and q=0. With the center as the reference, signals on the high frequency side are grouped into one group and signals on the low frequency side are grouped into the other group.

The power calculators 212, 213 calculate the total power level of the input signals, respectively. The comparator 214 compares the total power levels for the two groups calculated by the power calculators 212, 213, and selects the group having the greater total power level as a well received group. The substituting unit 215 substitutes the signals in the group having the smaller total power level with the signals in the group having the greater total power level. Specifically, the substituting unit 215 substitutes $s_9, s_{10}, \ldots, s_{16}$ with $s_7, s_6, \ldots, s_0$, respectively, if the total power level of $s_0, s_1, \ldots, s_7$ is greater than that of $s_9, s_{10}, \ldots, s_{16}$ as the result of comparison by the comparator 214. On the other hand, the substituting unit 215 substitutes $s_7, s_6, \ldots, s_0$ with $s_9, s_{10}, \ldots, s_{16}$, respectively, if the total power level of $s_9, s_{10}, \ldots, s_{16}$ is greater than that of $s_0, s_1, \ldots, s_7$ as the result of comparison by the comparator 214.

The signals corrected in this manner are input to the differential encoder 206 shown in FIG. 7. The differential encoder 206 performs differential coding on information concerning phase of the GCL sequence sk. In other words, the differential encoder 206 outputs a sequence including elements obtained by subtracting anterior elements sk-1 from elements sk of the GCL sequence sk. The IDFT unit 207 performs 16-point IDFT on the sequence output from the differential encoder 206 including 16 elements to generate a time domain signal. The peak power calculator 208 calculates the power levels of the signals generated by the IDFT unit 207 corresponding to indexes 0 to 15. The unique cell information estimator 209 estimates unique cell information u by detecting an index corresponding to the maximum power level among the power levels calculated.

Figure 9:
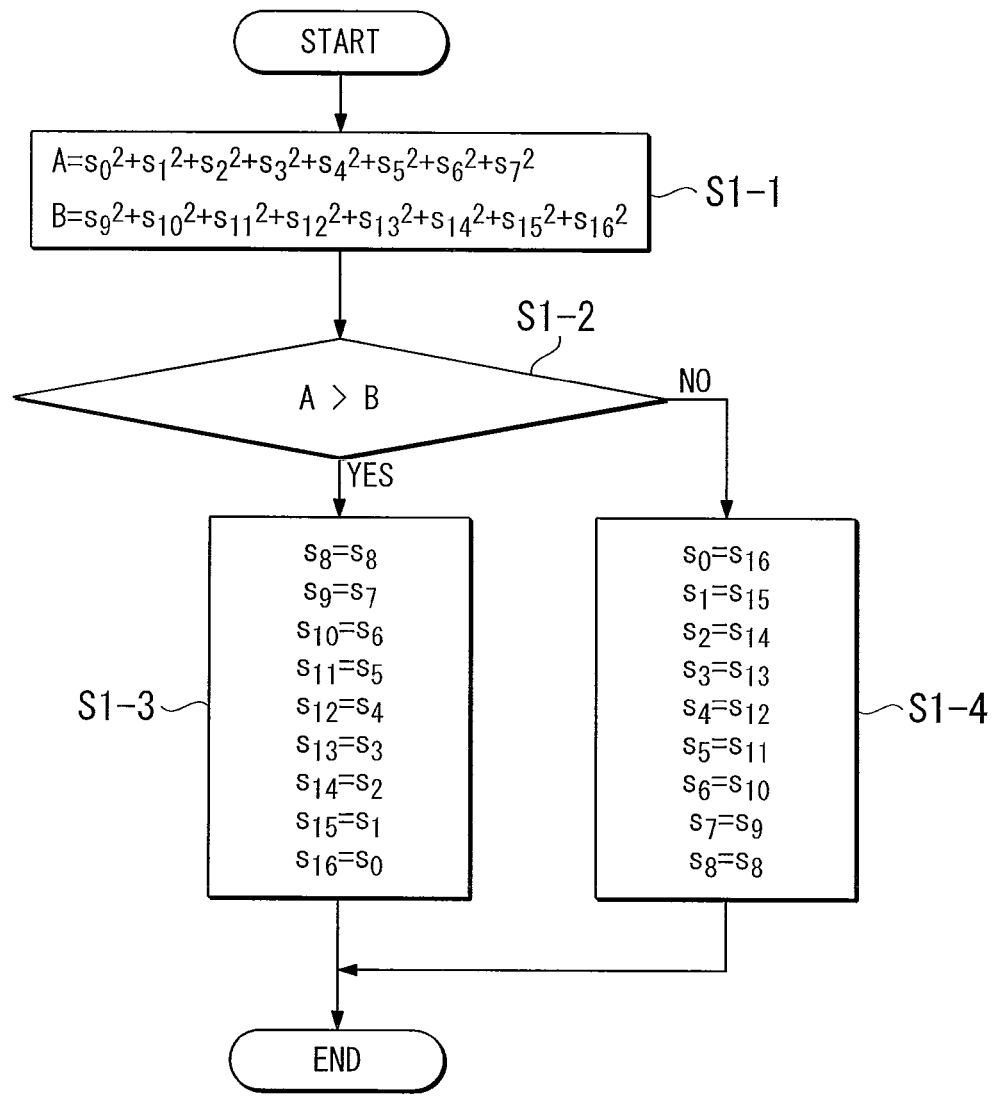
FIG. 9 is a flowchart illustrating operation of the GCL sequence corrector 210 implemented by software according to the first embodiment.

FIG. 9 is a flowchart illustrating operation of the GCL sequence corrector 210 implemented by CPU (Central Processing Unit), memory, and software for operating the CPU. At step S1-1, the total power level of $s_0, s_1, \ldots, s_7$ is substituted into a parameter A and the total power level of $s_9, s_{10}, \ldots, s_{16}$ is substituted into a parameter B.

At step S1-2, the parameter A and the parameter B are compared. If the parameter A is greater than the parameter B, the process proceeds to step S1-3. If the parameter A is equal to or smaller than the parameter B, the process proceeds to step S1-4. At step S1-3, substitution is performed such that $s_9=s_7, s_{10}=s_6, \ldots, s_{16}=s_0$. At step S1-4, substitution is performed such that $s_7=s_9, s_6=s_{10}, \ldots, s_0=s_{16}$. Thus, unique cell information to be used for cell search can be identified using well received signals having large reception power levels. Thereby, unique cell information can be identified even if the reception condition of one of the groups grouped based on the symmetry of the GCL sequence is bad.

Figure 6B:
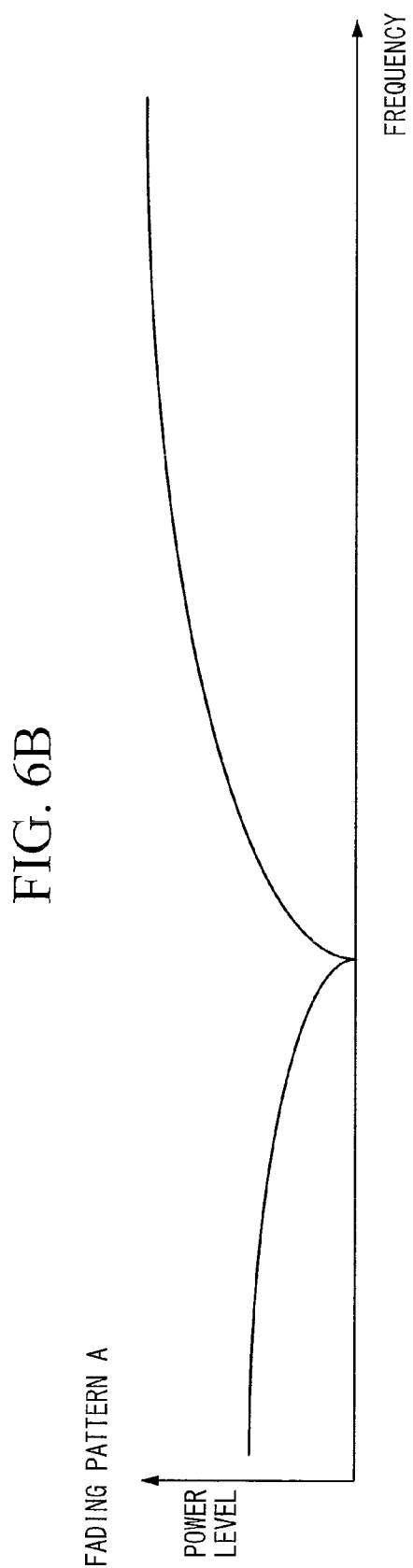
FIG. 6B illustrates an example of fading of SCH according to the first embodiment.

For example, when the reception power levels degrade around subcarriers 58 and 59 due to the fading effect as shown in FIG. 6B, the total reception power level of $s_0, s_1, \ldots, s_7$ allocated to the subcarriers 48, 50, ..., 62 is smaller than that of $s_9, s_{10}, \ldots, s_{16}$ allocated to the subcarriers 2, 4, ..., 18. Accordingly, larger errors occur when the phase differences among $s_0, s_1, \ldots, s_7$ are calculated, thereby affecting estimation of unique cell information. For this reason, signals are rearranged using only $s_8, s_9, \ldots, s_{16}$ to calculate the phase differences, thereby reducing the estimation errors.

The comparator 214 of the first embodiment selects a group to be used for comparison of the total reception power levels. As in the aforementioned case of FIG. 6B, however, the reception power level around $s_5$ of the subcarrier 58 is very small. Therefore, it can be understood that larger errors occur when the phase differences between $s_4$ and $s_5$, and $s_5$ and $s_6$, thereby affecting estimation of unique cell information. For this reason, the given threshold power level may be preliminary set so that a group including the smaller number of $s_k$ having the reception power level smaller than the threshold power level is selected, and $s_k$ included in the non-selected group is substituted with $s_k$ included in the selected group.

Second Embodiment

Hereinafter, a base station device and a mobile station device according to a second embodiment of the present invention are explained with reference to accompanying drawings.

In the second embodiment, the base station device shown in FIG. 5 is used similarly to the first embodiment. GCL sequence to be used by the GCL sequence generator 101 of the SCH transmitter 100 included in the base station device is assumed to be $s_k$ in Expression (1) where $b_i=1$, $q=0$, and $N=17$.

Figure 10:
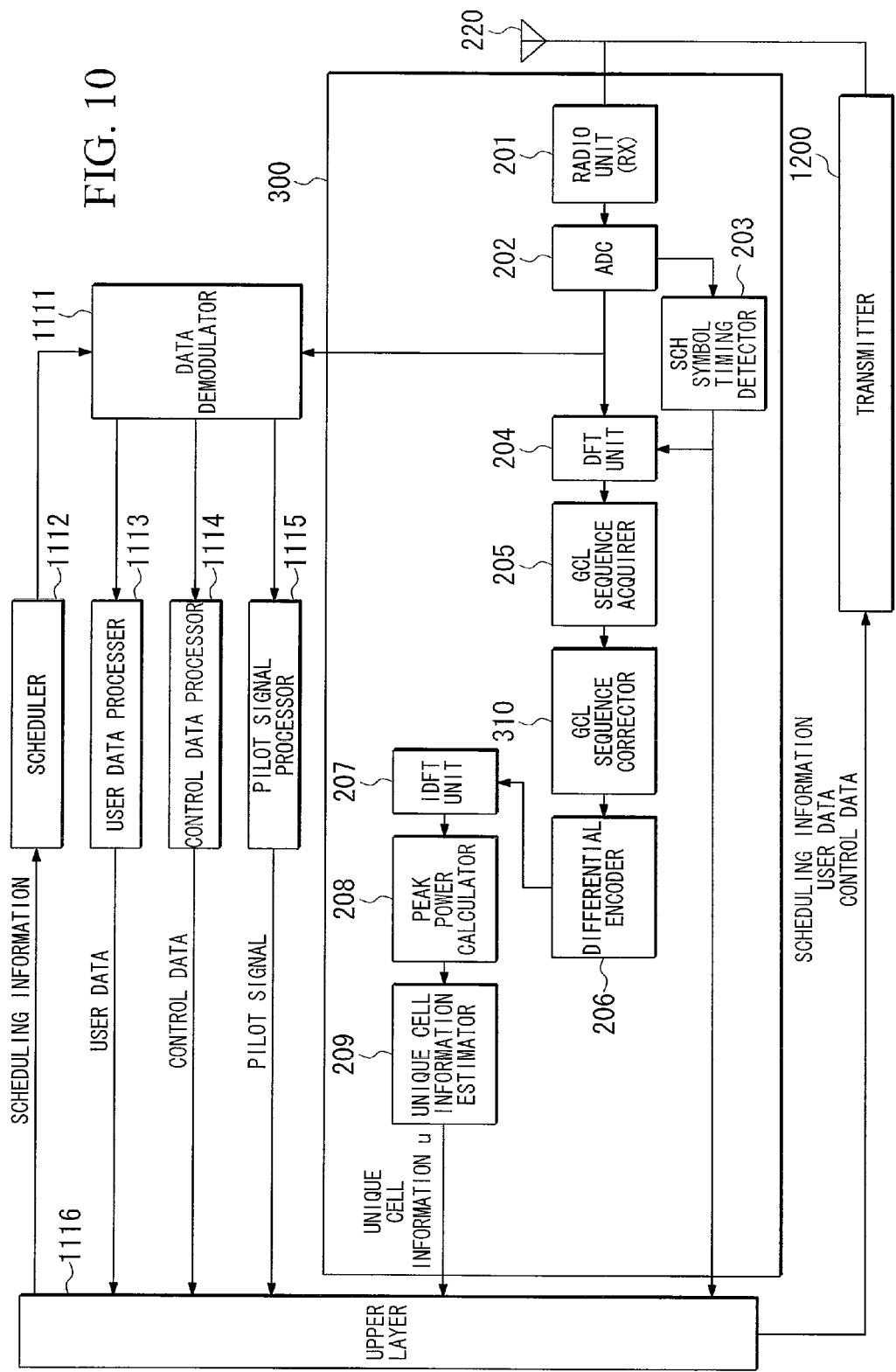
FIG. 10 is a schematic block diagram illustrating the configuration of a mobile station device according to a second embodiment of the present invention.
Figure 11:
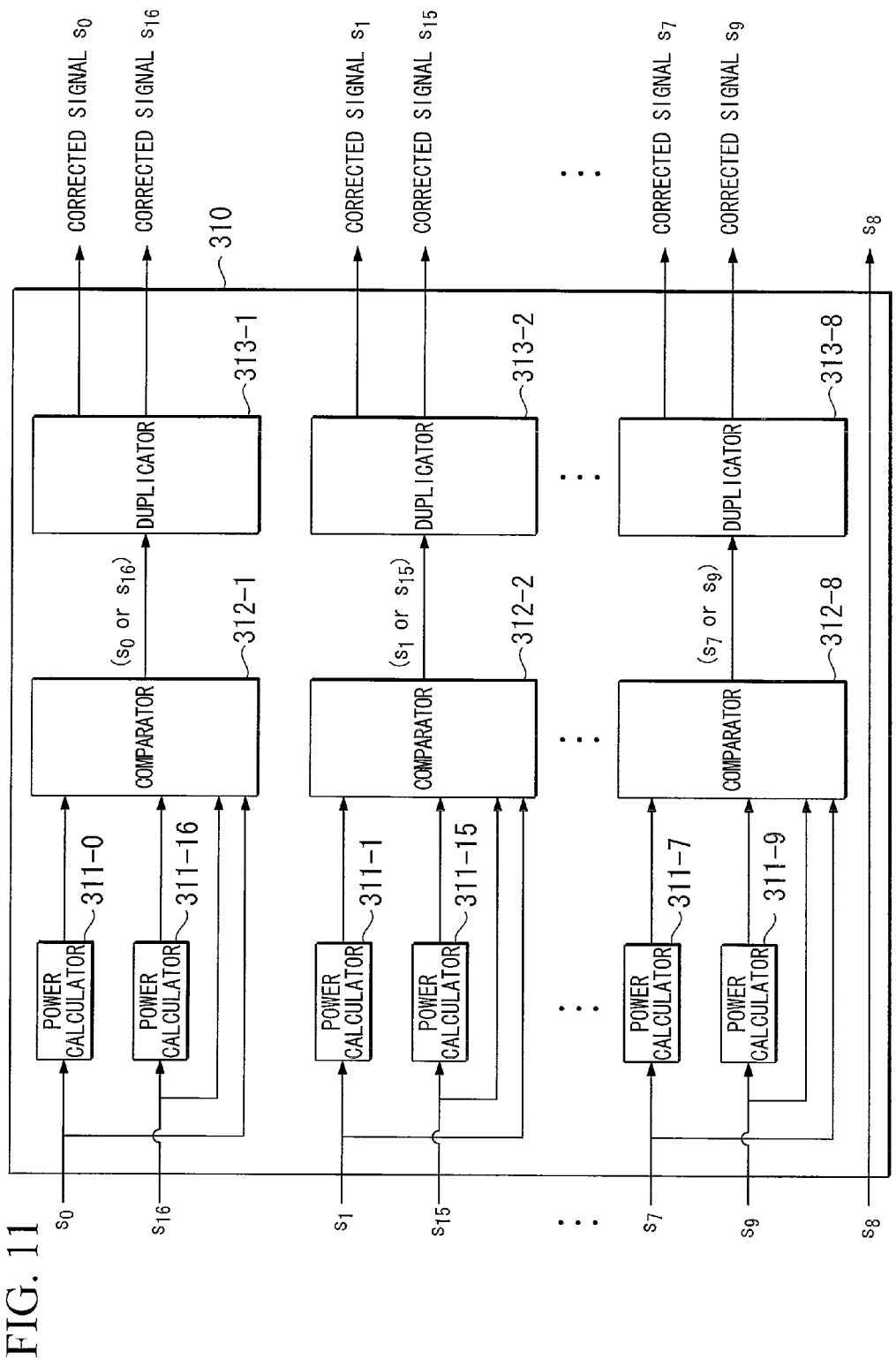
FIG. 11 is a schematic block diagram illustrating the inner configuration of a GCL sequence corrector 310 according to the second embodiment.

FIG. 10 is a schematic block diagram illustrating the configuration of the mobile station device. Like reference numerals denote like units shown in FIG. 7, and explanations thereof are omitted. Reference numeral 300 denotes a cell search unit and differs from the cell search unit 200 shown in FIG. 7 only in that a GCL sequence corrector 310 is included in place of the GCL sequence corrector 210. The detail of the GCL sequence corrector 310 is explained hereinafter with reference to FIG. 11. FIG. 11 is a schematic block diagram illustrating the inner configuration of the GCL sequence corrector (symbol corrector) 310 according to the second embodiment. The GCL sequence corrector 310 includes: power calculators 311-0 to 311-16 (excluding 311-8 which will be omitted hereinafter) that calculate power levels of respective input signals $s_0$ to $s_{16}$ (excluding $s_8$); comparators 312-1 to 312-8, each of which compares the power levels of two input signals and outputs one signal having a greater power level; and duplicators 313-1 to 313-8, each of which duplicates one input signal to output two signals.

The power calculators 311-0 to 311-16 calculate power levels of signals $s_0, s_1, \ldots, s_{16}$ respectively input thereto. Each of the comparators 312-1 to 312-8 receives two signals $s_{k1}$ and $s_{k2}$ in symmetric relation of GCL sequence and the power levels thereof, compares the two power levels, and outputs one signal having a greater power level. Specifically, the comparator 312-1 compares the power level of the signal $s_0$ calculated by the power calculator 311-0 and the power level of the signal $s_{16}$ calculated by the power calculator 311-16, and outputs the signal $s_0$ or $s_{16}$ having a greater power level. Each of the duplicators 313-1 to 313-8 duplicate the signal output from the corresponding one of the comparators 312-1 to 312-8 and outputs two signals as the corrected signals $s_{k1}$ and $s_{k2}$.

Thereby, the GCL sequence corrector 310 of the second embodiment substitutes one of the input signals $s_0$ and $s_{16}$ which has a smaller power level with the other signal having a greater power level. Similar processing is performed on the signals $s_1$ and $s_{15}$, $s_2$ and $s_{14}$, ..., $s_7$ and $s_9$. The center signal $s_8$ is output as is without correction. The signals corrected in this manner are input to the differential encoder 206 shown in FIG. 10. The following processes are similar to those of the first embodiment, and therefore explanations thereof are omitted here.

Figure 12:
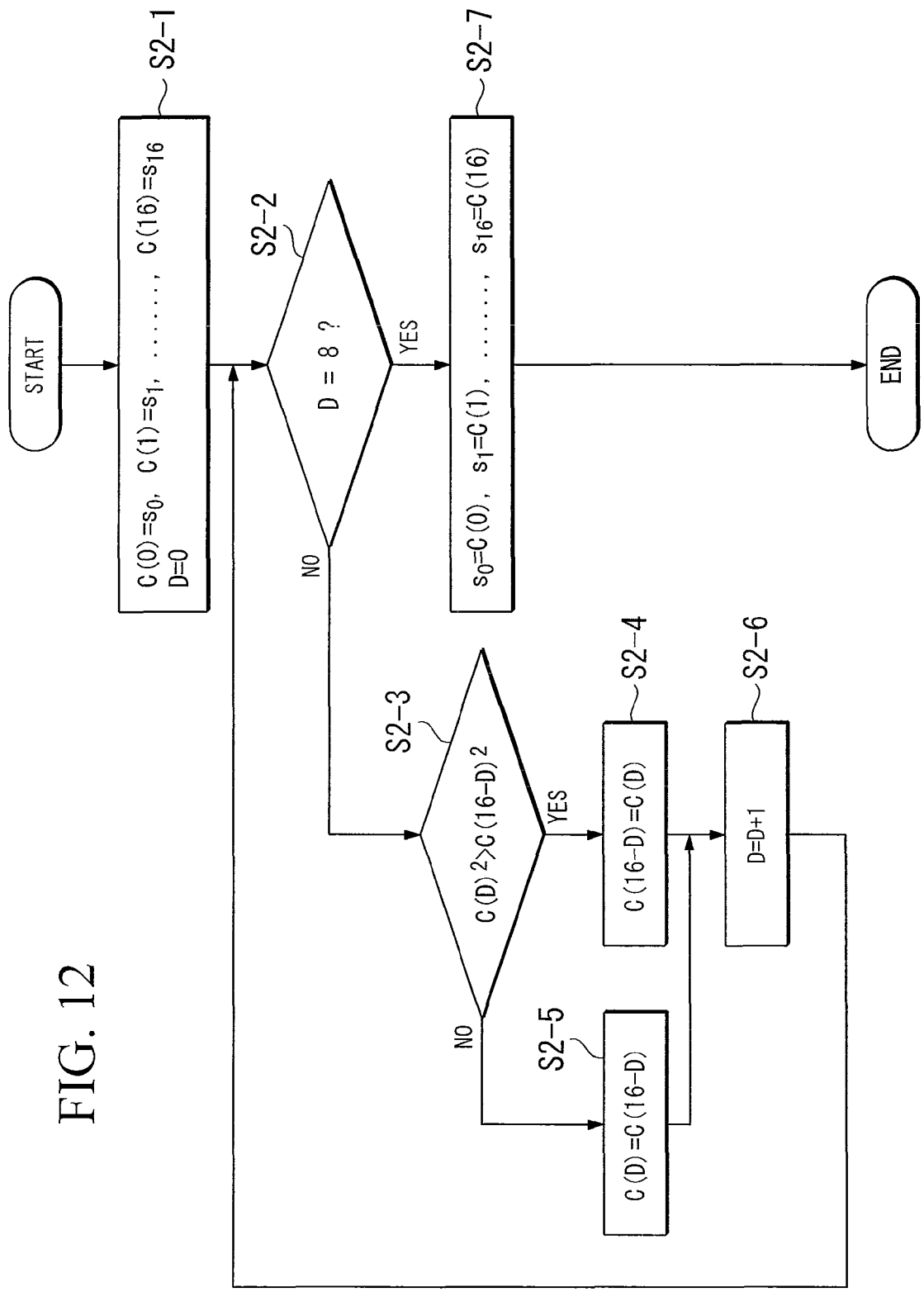
FIG. 12 is a flowchart illustrating operation of the GCL sequence corrector 310 implemented by software according to the second embodiment.

FIG. 12 is a flowchart illustrating operation of the GCL sequence corrector 310 implemented by CPU, memory, and software for operating the CPU. At step S2-1, the GCL sequence corrector 310 substitutes the input signals $s_0, s_1, \ldots, s_{16}$ into parameters C(0), C(1), ..., C(16), respectively, and substitutes 0 into a parameter D. At step S2-2, a value of the parameter D is referred to. The process proceeds to step S2-7 if D=8 or to step S2-3 if D≠8. At step S2-3, the power levels of C(D) and C(16-D) are compared. The process proceeds to step S2-4 if the power level of C(D) is greater than that of C(16-D) or to step S2-5 if the power level of C(16-D) is greater than that of C(D). At step S2-4, C(D) is substituted into C(16-D) and the process proceeds to step S2-6. At step S2-5, C(16-D) is substituted into C(D) and the process proceeds to step S2-6. At step S2-6, operation of D=D+1 is performed and the process proceeds to step S2-2. At step S2-7, C(0), C(1), ..., C(16) are substituted into $s_0, s_1, \ldots, s_{16}$.

Thus, unique cell information to be used for cell search can be identified using well received signals having large reception power levels.

Third Embodiment

Hereinafter, a base station device and a mobile station device according to a third embodiment of the present invention are explained with reference to accompanying drawings. In the third embodiment, the base station device shown in FIG. 5 is used similarly to the first embodiment. A GCL sequence to be used by the GCL sequence generator 101 of the SCH transmitter 100 included in the base station device is assumed to be $s_k$ in Expression (1) where $b_i=1$, $q=0$, and $N=17$.

Figure 13:
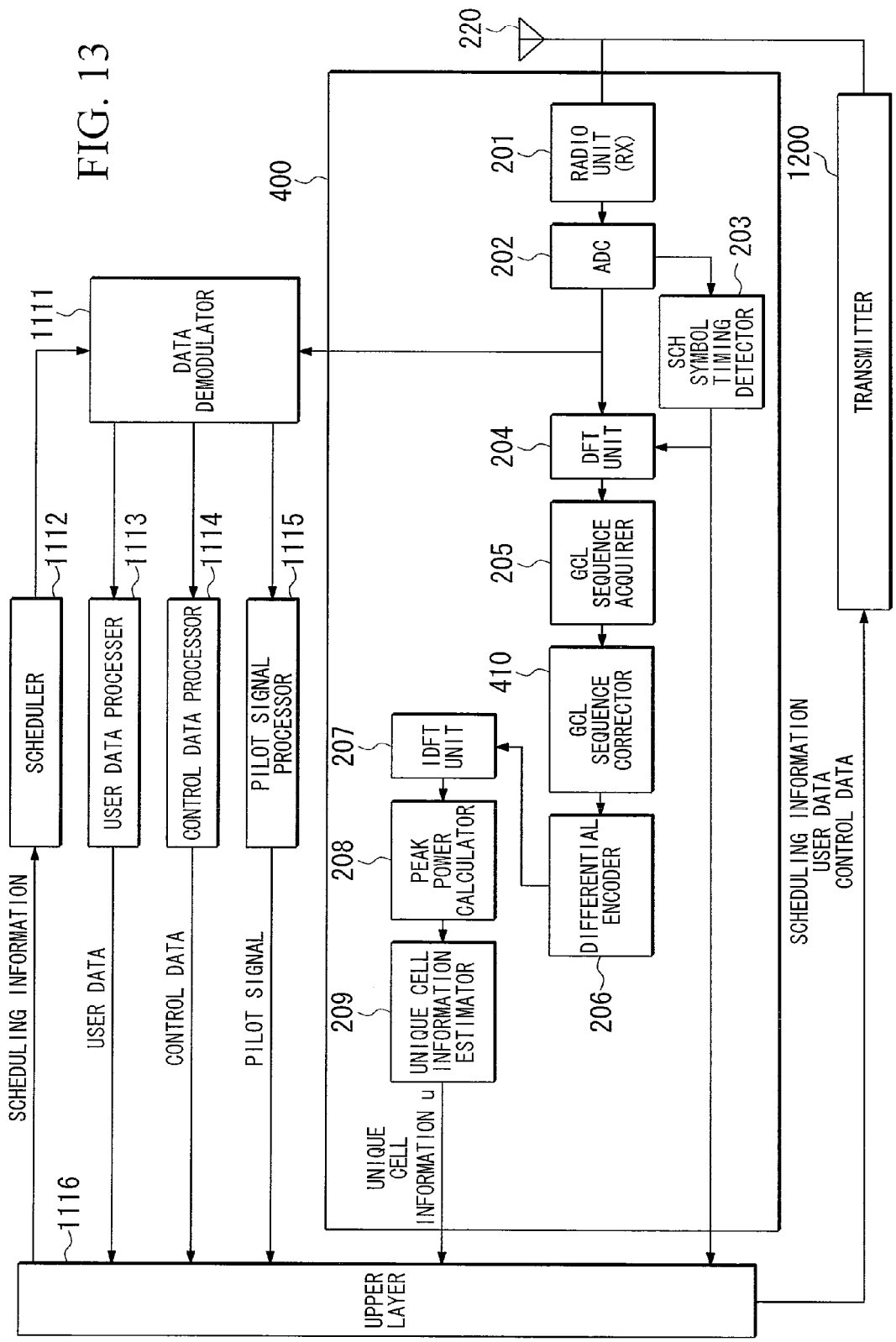
FIG. 13 is a schematic block diagram illustrating the configuration of a mobile station device according to a third embodiment of the present invention.

FIG. 13 is a schematic block diagram illustrating the configuration of the mobile station device according to the third embodiment. Like reference numerals denote like units shown in FIG. 7, and explanations thereof are omitted.

Figure 14:
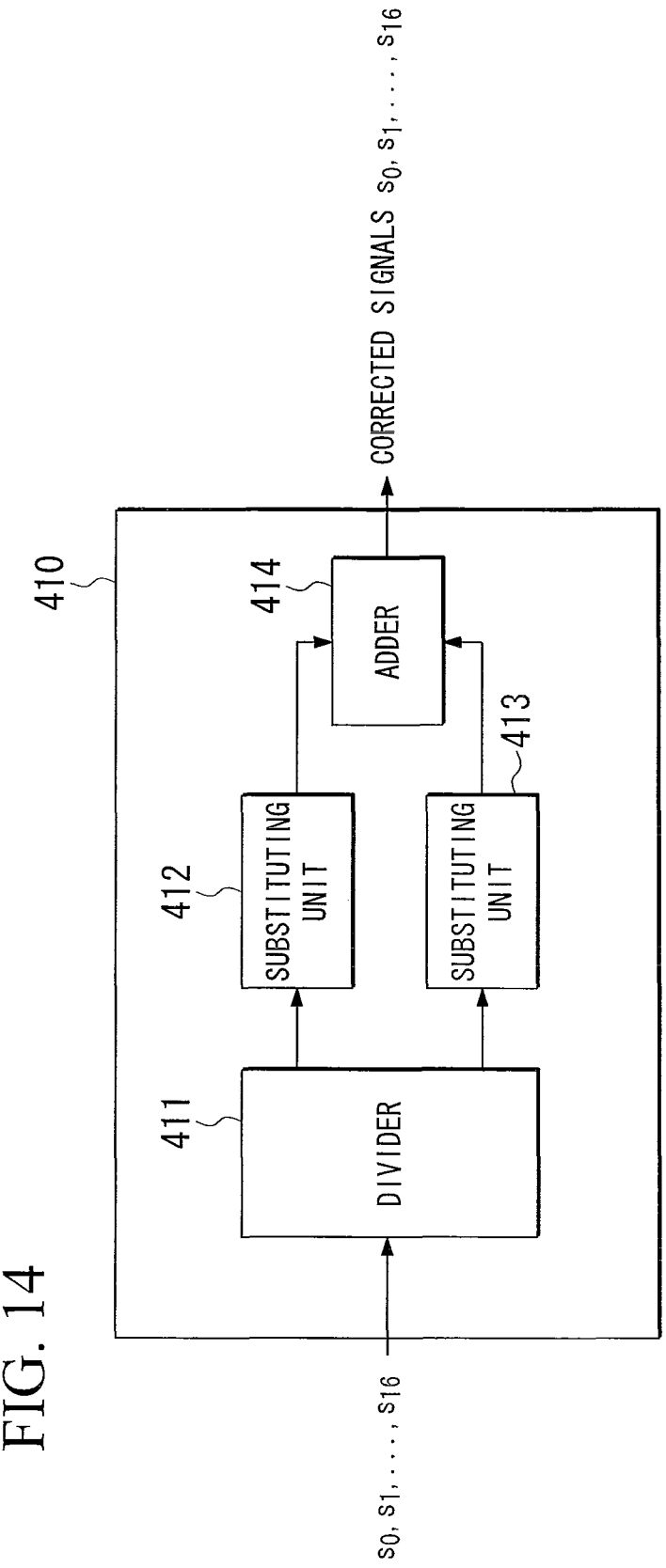
FIG. 14 is a schematic block diagram illustrating the inner configuration of a GCL sequence corrector 410 according to the third embodiment.

Reference numeral 400 denotes a cell search unit and differs from the cell search unit 200 shown in FIG. 7 only in that a GCL sequence corrector 410 is included in place of the GCL sequence corrector 210. The detail of the GCL sequence corrector 410 is explained hereinafter with reference to FIG. 14. FIG. 14 is a schematic block diagram illustrating the inner configuration of the GCL sequence corrector (symbol corrector) 410 according to the third embodiment.

The GCL sequence corrector 410 includes: a divider 411 that outputs signals $s_0, s_1, \ldots, s_{16}$ to two substituting units 412 and 413; a substituting unit 412 that substitutes the signals $s_9, s_{10}, \ldots, s_{16}$ with the corresponding signals $s_7, s_6, \ldots, s_0$, respectively, based on the symmetry of the GCL sequence; a substituting unit 413 that substitutes the signals $s_0, s_1, \ldots, s_7$ with the corresponding signals $s_{16}, s_{15}, \ldots, s_9$, respectively, based on the symmetry of the GCL sequence; and an adder 414 that adds signals output from the substituting units 412 and 413.

The divider 411 outputs the input signals $s_0, s_1, \ldots, s_{16}$ to the substituting units 412 and 413. The substituting unit 412 outputs signals $s_0, s_1, \ldots, s_7, s_8, s_7, s_6, \ldots, s_0$ after the aforementioned substitution. The substituting unit 413 outputs signals $s_{16}, s_{15}, \ldots, s_9, s_8, s_9, s_{10}, \ldots, s_{16}$. The adder 414 adds signals which are received from the substituting units 412 and 413 and located at the same position, and outputs the resultant signals. In other words, the adder 414 adds the signal $s_0$ from the substituting unit 412 and the signals $s_{16}$ from the substituting unit 413 and outputs a corrected signal $s_0$. Then, the adder 414 adds the signal $s_1$ from the substituting unit 412 and the signals $s_{15}$ from the substituting unit 413 and outputs a corrected signal $s_1$. Then, the adder 414 adds the signal $s_2$ from the substituting unit 412 and the signals $s_{14}$ from the substituting unit 413 and outputs a corrected signal $s_2$, and so on. Similarly, the adder 414 adds the signal $s_8$ from the substituting unit 412 and the signals $s_8$ from the substituting unit 413 and outputs a corrected signal $s_8$, and so on. Similarly, the adder 414 adds the signal $s_0$ from the substituting unit 412 and the signals $s_{16}$ from the substituting unit 413 and outputs a corrected signal $s_{16}$. Consequently, each of the corrected signals is a signal obtained by adding corresponding signals based on the symmetry of the GCL sequence.

Figure 15:
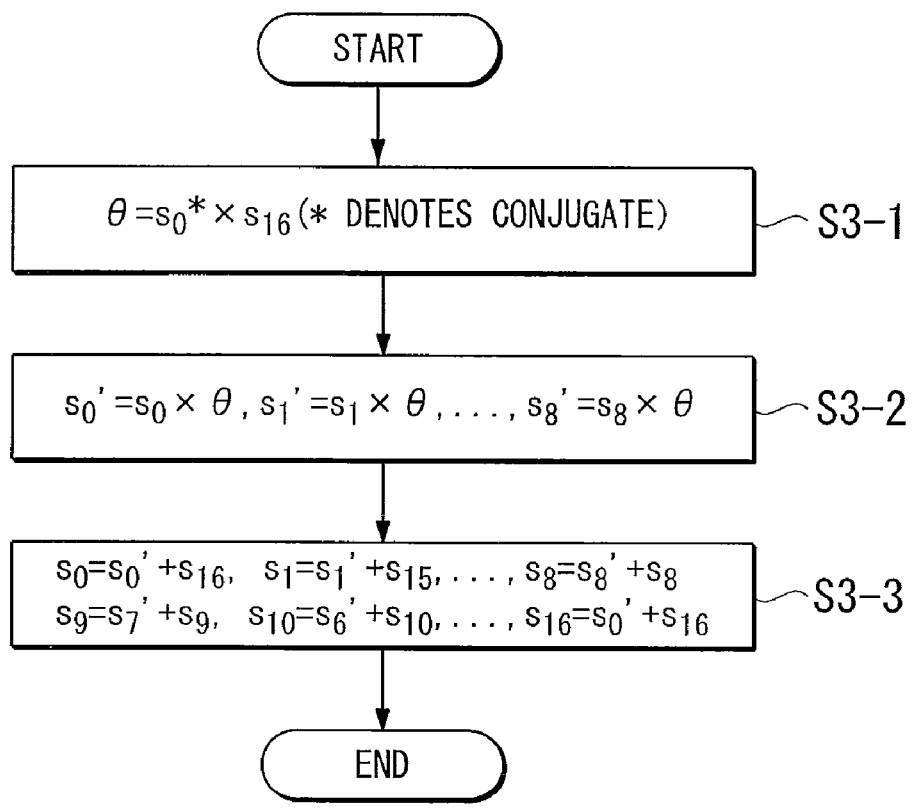
FIG. 15 is a flowchart illustrating operation of the GCL sequence corrector 410 implemented by software according to the third embodiment.

FIG. 15 is a flowchart illustrating operation of the GCL sequence corrector 410 implemented by CPU, memory, and software for operating the CPU. In this flowchart, rotation with the phase difference θ between the input signals $s_0$ and $s_{16}$ is applied to the phases of $s_0, s_1, \ldots, s_8$ at steps S3-1 and S3-2, thereby reducing the effect of power degradation due to the phase difference upon addition of signals. At step S3-1, the phase difference θ between the input signals $s_0$ and $s_{16}$ is calculated. At step S3-2, rotation θ is applied to $s_0, s_1, \ldots, s_8$ that the phase of $s_0$ is equal to that of $s_{16}$, and $s_0', s_1', \ldots, s_8'$ are output as a result. At step S3-3, the results of adding $s_0', s_1', \ldots, s_8'$ and $s_{16}, s_{15}, \ldots, s_8$ are substituted into $s_0, s_1, \ldots, s_{16}$ to be output.

In the third embodiment, the probability of calculating the phase difference using signals having very small reception power levels is reduced by the process at step S 3-3 shown in FIG. 15 or the addition by the adder 414 shown in FIG. 14, thereby reducing the estimation errors of unique cell information u.

Fourth Embodiment

Hereinafter, a base station device and a mobile station device according to a fourth embodiment of the present invention are explained with reference to accompanying drawings.

Figure 16:
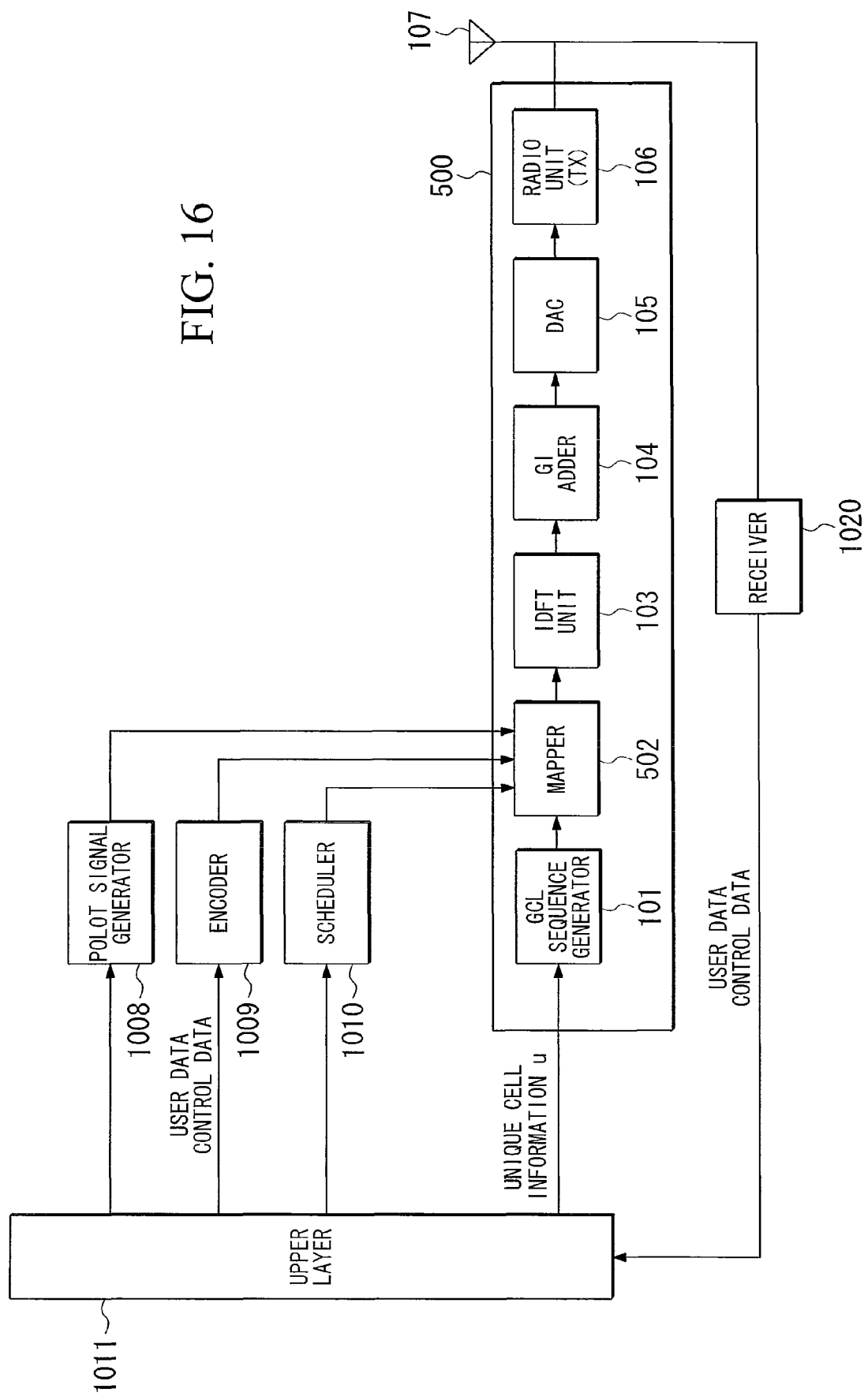
FIG. 16 is a schematic block diagram illustrating the configuration of a base station device according to a fourth embodiment of the present invention.

FIG. 16 is a schematic block diagram illustrating the configuration of the base station device according to the fourth embodiment. Like reference numerals denote like units shown in FIG. 5, and explanations thereof are omitted. Reference numeral 500 denotes an SCH transmitter and differs from the SCH transmitter 100 only in that a mapper 502 is included in place of the mapper 102. Similar to the first embodiment, GCL sequence to be used by the GCL sequence generator 101 of the SCH transmitter 500 is assumed to be $s_k$ in Expression (1) where $b_i=1$, q=0, and N=17.

Figure 17:
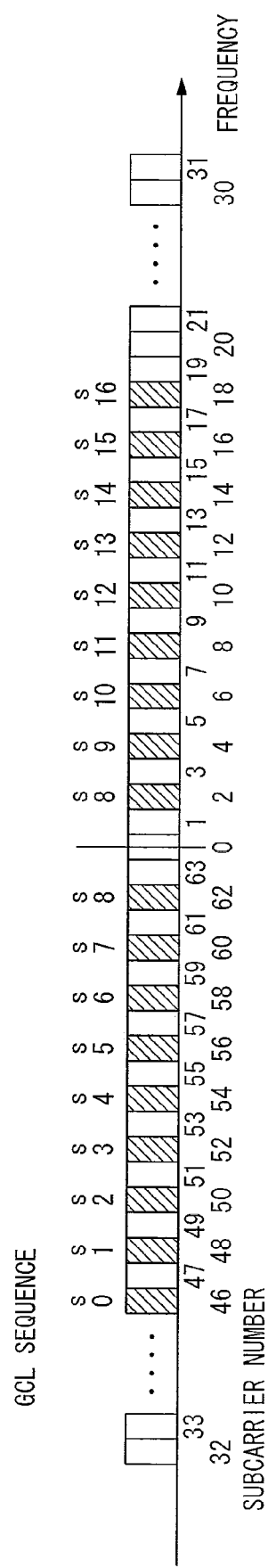
FIG. 17 illustrates mapping of GCL sequence $s_k$ to subcarriers performed by a mapper 502 according to the fourth embodiment.

The mapper 502 maps respective elements of the GCL sequence $s_k$ calculated by the GCL sequence calculator 101 onto even-numbered subcarriers on the frequency axis. The mapping performed by mapper 502 is different from that performed by the mapper 102 shown in FIG. 5. Although the mapper 502 maps the calculated GCL sequence $s_k$ onto even-numbered subcarriers on the frequency axis as shown in FIG. 17, the mapper 502 maps the element $s_8$ onto subcarriers (subcarriers 62 and 2) across the center frequency. Accordingly, subcarrier 0 is assigned to the center frequency. Then, subcarriers 1, 2, . . . , 31 are sequentially assigned toward the higher frequency direction, and subcarriers 63, 62, . . . , 32 are sequentially assigned toward the lower frequency direction, as shown in FIG. 17. In this case, the mapper 502 maps the element $s_0$ of the GCL sequence $s_k$ onto subcarrier 46, the element $s_1$ onto subcarrier 48, . . . , the element $s_8$ onto subcarriers 62 and 2, the element $s_9$ onto subcarrier 4, . . . , the element $s_{16}$ onto subcarrier 18. Consequently, SCH symbols assigned to the subcarriers symmetric to subcarrier 0 have the same value.

Figure 18:
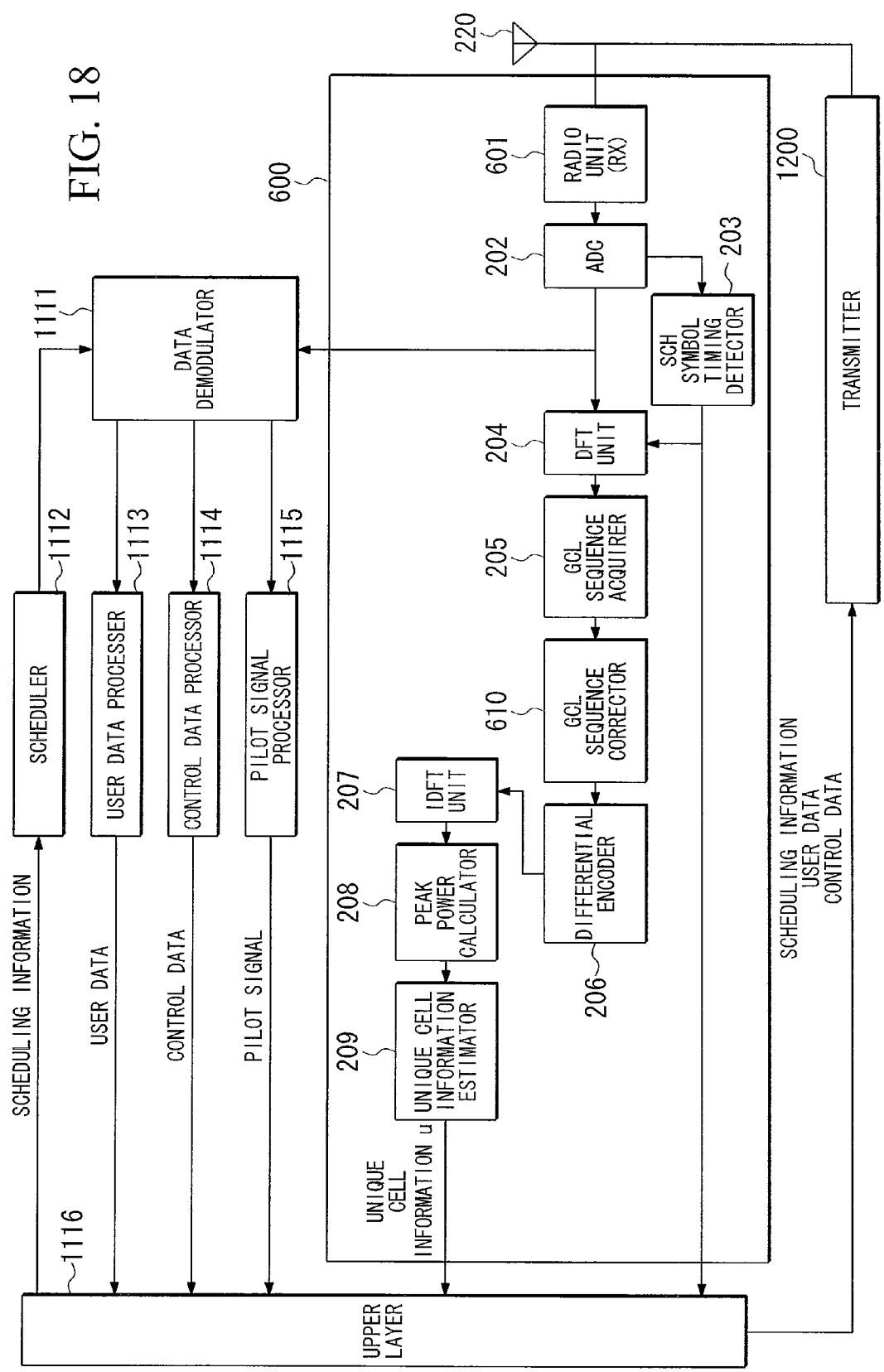
FIG. 18 is a schematic block diagram illustrating the configuration of a mobile station device according to the fourth embodiment.
Figure 19:
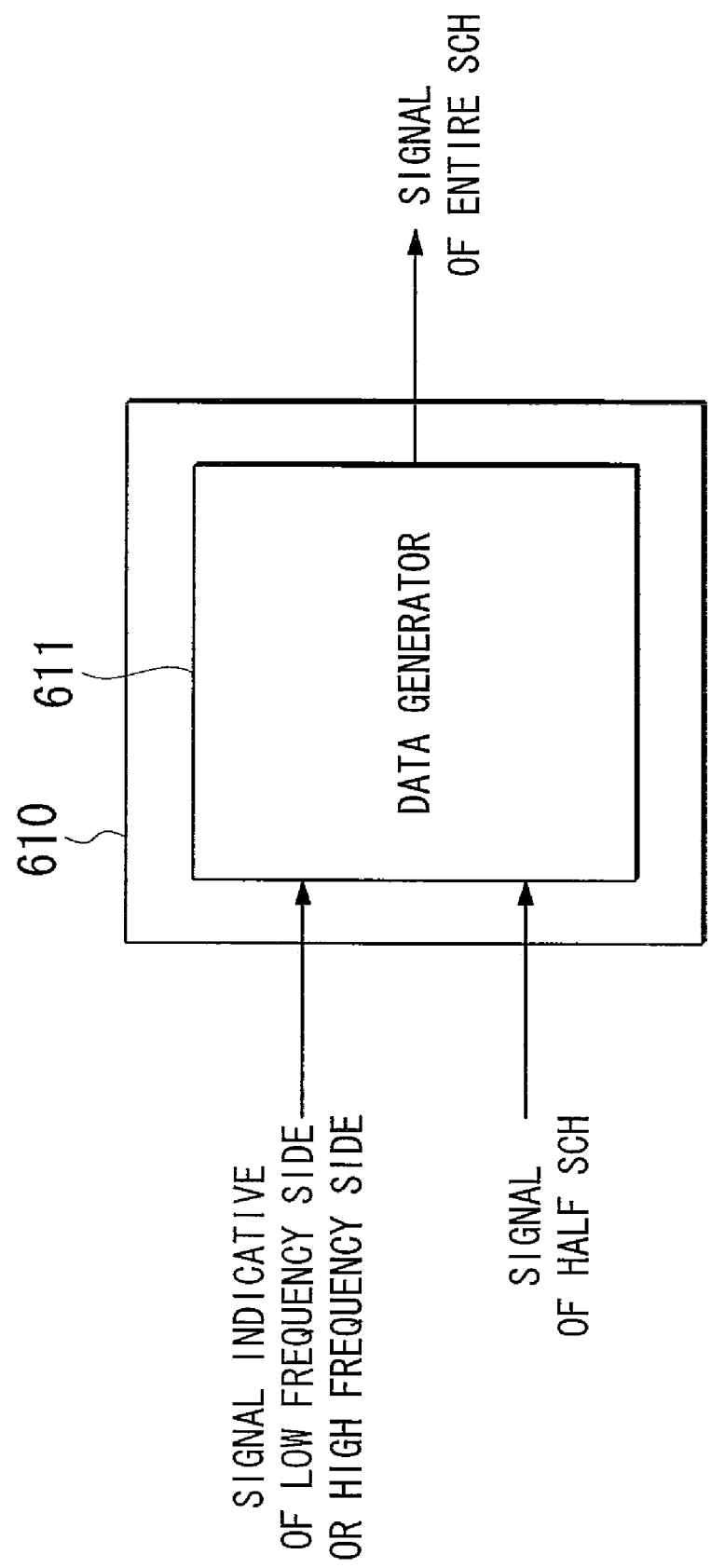
FIG. 19 is a schematic block diagram illustrating the inner configuration of a GCL sequence corrector 610 according to the fourth embodiment.
Figure 20:
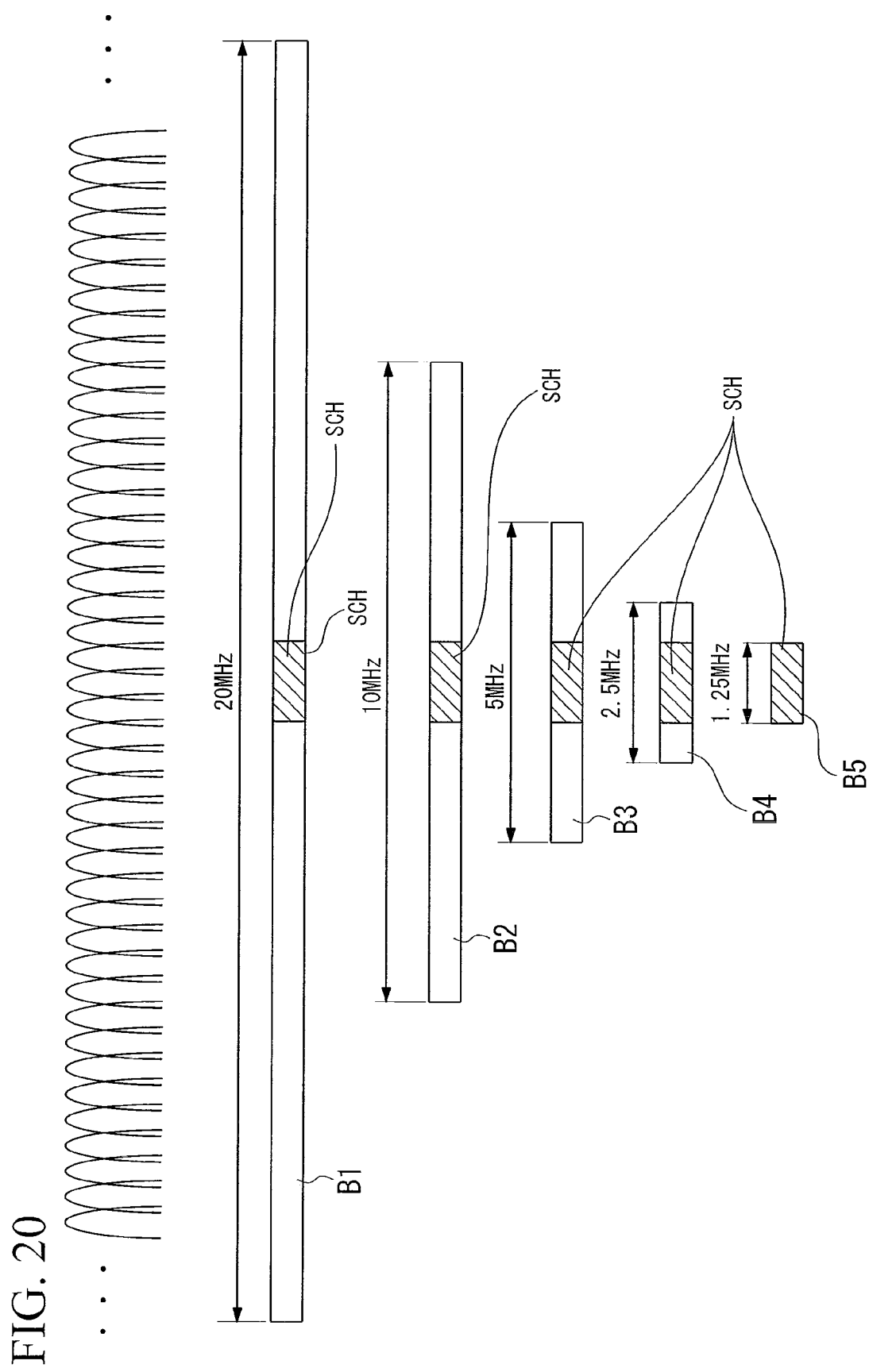
FIG. 20 illustrates the relationship between different frequency bands B1 to B5 of base station devices and SCH.
Figure 21:
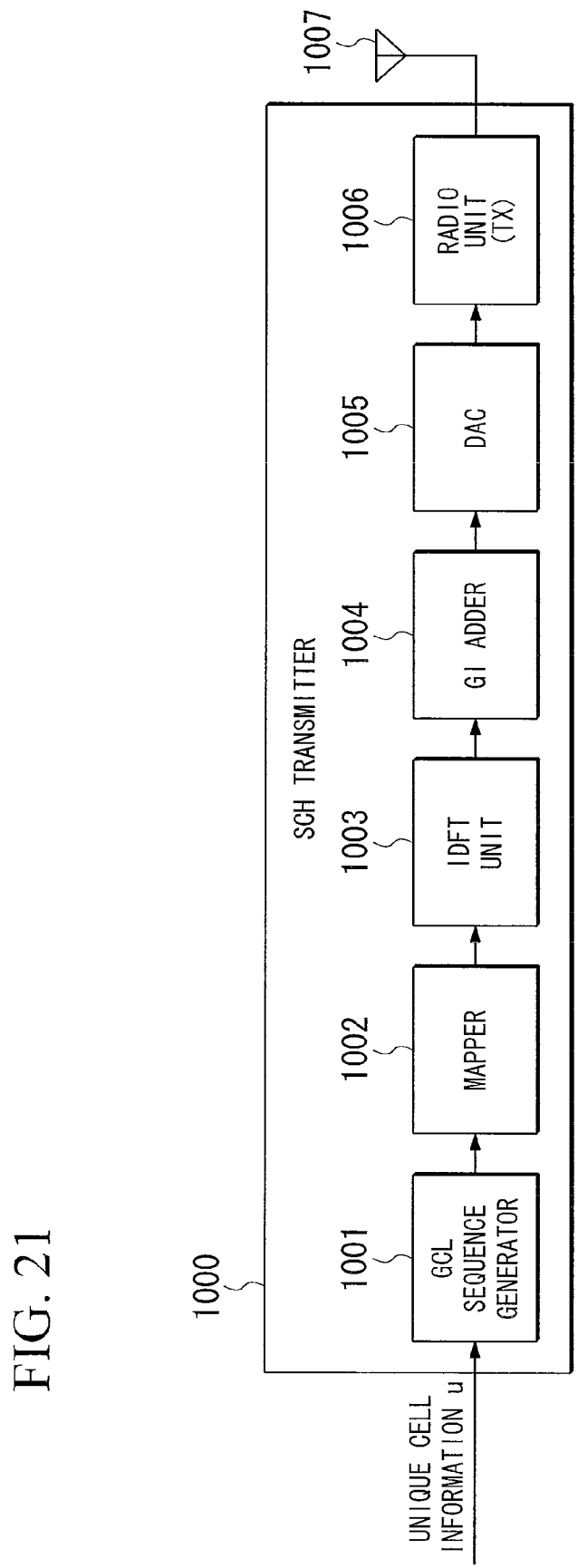
FIG. 21 is a schematic block diagram illustrating the configuration of an SCH transmitter 1000 included in a conventional base station device.
Figure 22:
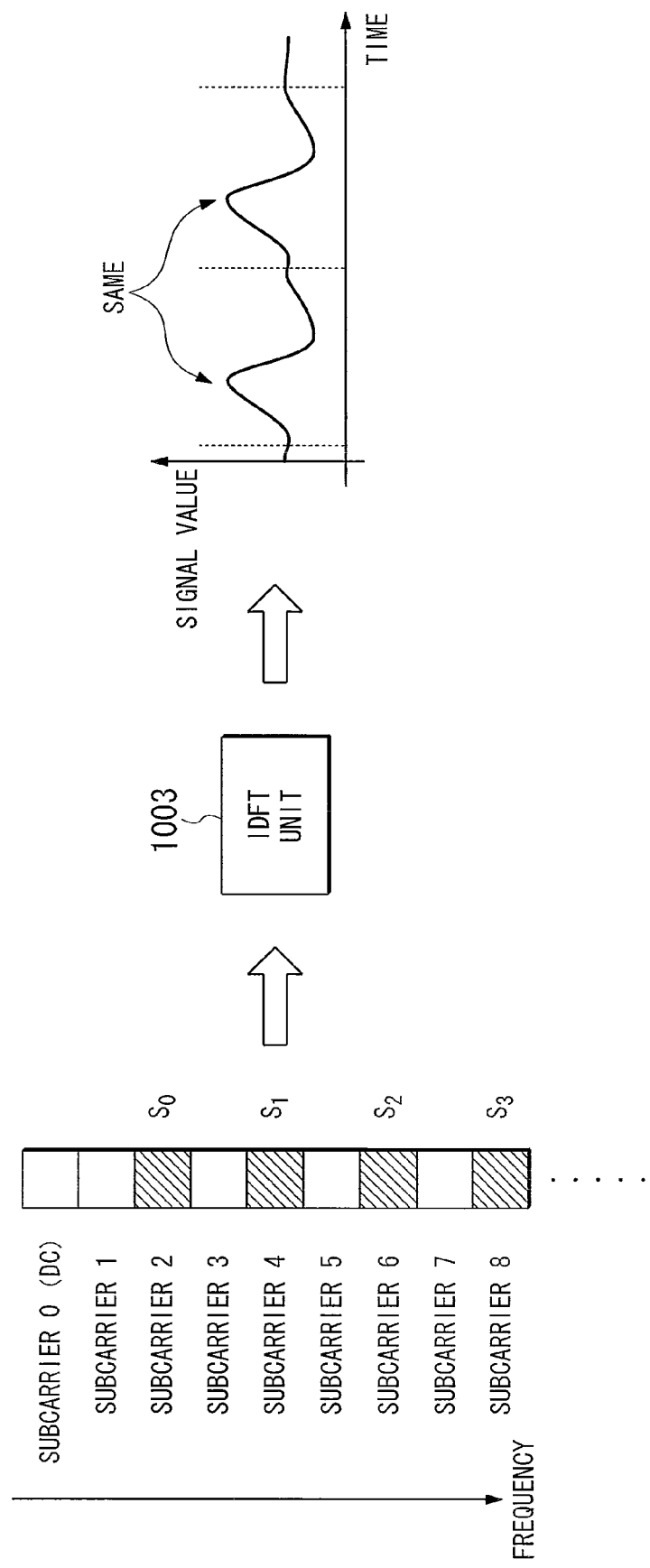
FIG. 22 illustrates mapping of GCL sequence $s_k$ to subcarriers performed by a mapper 1002 included in the conventional base station device.
Figure 23:
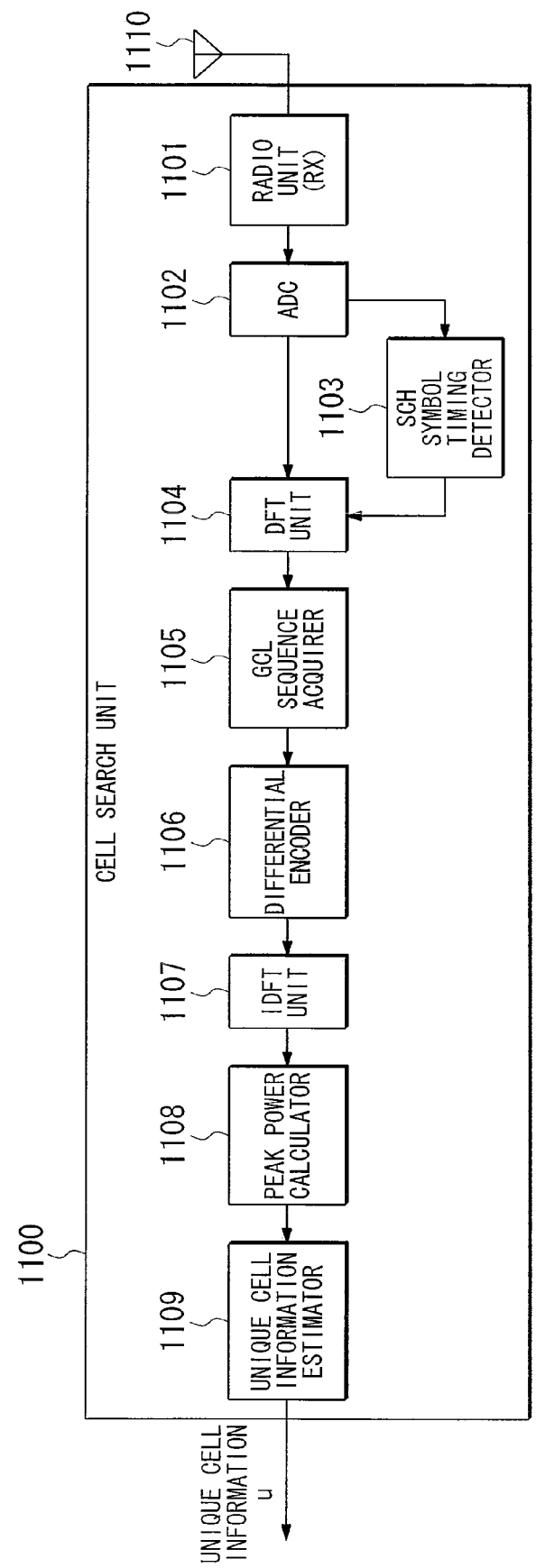
FIG. 23 is a schematic block diagram illustrating the configuration of a cell search unit included in the conventional mobile station device.

FIG. 18 is a schematic block diagram illustrating the configuration of the mobile station device. In FIG. 18, like reference numerals denote like units shown in FIG. 7, and explanations thereof are omitted. Reference numeral 600 denotes a cell search unit and differs from the cell search unit 200 in that a radio unit (RX) 601 and a GCL sequence corrector 610 are included in place of the radio unit (RX) 201 and the GCL sequence corrector 210. The radio unit (RX) 601 receives signals transmitted from a base station device. The bandwidth in which the radio unit 601 can perform reception is half that in which SCH is transmitted. The radio unit (RX) 601 determines which one of high and low frequency sides of the band signals are received in, and indicates the determined side to the GCL sequence corrector 610. The GCL sequence corrector (symbol interpolator) 610 corrects the received GCL sequence based on the symmetry thereof. FIG. 19 is a schematic block diagram illustrating the inner configuration of the GCL sequence corrector.

The GCL sequence corrector 610 includes a data generator 611 that generates a new signal from multiple input signals. The data generator 611 receives a signal indicating which one of high and low frequency sides of the band in which SCH is transmitted the mobile station device receives signals in, and a SCH signal on the indicated side. If the radio unit 601 receives signals on the low frequency side, the data generator 611 generates signals on the higher frequency side using the input signals $s_0, s_1, \ldots, s_7, s_8$ and outputs signals $s_0, s_1, \ldots, s_7, s_8, s_7, s_6, \ldots, s_0$. If the radio unit 601 receives signals on the high frequency side, the data generator 611 generates signals on the low frequency side using the input signals $s_8, s_9, s_{10}, \ldots, s_{16}$ and outputs signals $s_{16}, s_{15}, \ldots, s_9, s_8, s_9, s_{10}, \ldots, s_{16}$.

Thus, unique cell information can be estimated even if only half SCH is received. This indicates that, for example, a mobile station device performing transmission and reception of data by setting reception frequency within a band in which a half SCH transmitted from a neighboring cell can be received can perform neighboring cell search without newly setting reception frequency so that the entire SCH can be received, i.e., without suspending data transmission and reception.

Although the present embodiment explains the case where the center of symmetry of the GCL sequence corresponds to the center of indexes (parameter q'=0), the center of the symmetry may be at another position. In this case, the radio unit 601 receives signals in a band of SCH to which the half the number of elements included in the GCL sequence $s_k$ are sequentially assigned from the center of symmetry of the GCL sequence $s_k$. Then, the data generator 611 interpolates the remaining half of the signals based on the signals received in the band. Specifically, when N=17, q=4, the parameter q'=q mod N=4 mod 17=4 and the center is (N−1)/2−q'=(17−1)/2−4=4. In this case, the GCL sequence $s_k$ is symmetric to the element $s_4$ such that $s_5=s_3, s_6=s_2, \ldots, s_8=s_0, s_9=s_{16}, s_{10}=s_{15}, \ldots, s_{12}=s_{13}$. The signals received by the radio unit 610 based on the symmetry and input to the data generator 611 are the signals $s_4$ to $s_{12}$. The data generator 611 generates $s_{12}$ to $s_{16}$ and $s_0$ to $s_3$ using the signals $s_5$ to $s_{12}$.

Thus, unique cell information can be estimated even if a bandwidth in which the mobile station device can perform reception is half that of SCH.

The GCL sequence correction methods according to the first to third embodiments can be switched based on an instruction from the base station device, the results of measurements of channel variation or the power levels of reception signals performed by the mobile station device, or a load of reception processing.

Additionally, dedicated hardware may implement: the GCL sequence generator 101, the mapper 102, the IDFT unit 103, and the GI adder 104, which are shown in FIG. 5; the SCH symbol timing detector 203, the DFT unit 204, the GCL sequence acquirer 205, the GCL sequence corrector 210, the differential encoder 206, the IDFT unit 207, the peak power calculator 208, and the unique cell information estimator 209, which are shown in FIG. 7; the divider 211, the power calculators 212, 213, the comparator 214, and the substituting unit 215, which are shown in FIG. 8; the GCL sequence corrector 310 shown in FIG. 10; the power calculators 311-0 to 311-16, the comparators 312-1 to 312-8, and the duplicators 313-1 to 313-8, which are shown in FIG. 11; the GCL sequence corrector 410 shown in FIG. 13; the divider 411, the substituting units 412, 413, and the adder 414, which are shown in FIG. 14; the mapper 502 shown in FIG. 16; the GCL sequence corrector 610 shown in FIG. 18; and the data generator 611 shown in FIG. 19. Each of the units may include CPU and memory and be implemented by loading a program for implementing the functions of each unit onto the memory and executing the program.

Although the embodiments of the present invention have been explained with reference to the accompanying drawings, the specific configuration is not limited thereto and various modifications can be made without departing from the scope of the present invention.

Explanations of the SCH structure have been given in the embodiments with the cases of the generated GCL sequence being allocated to even-numbered subcarriers, the present invention is not limited thereto, and the GCL sequence may be allocated at every n subcarrier. When the GCL sequence is mapped onto sequential subcarriers (i.e., n=1), it is necessary to preliminarily detect SCH symbol timing using other known signals. However, each of the methods explained in the embodiments can be used for correcting the acquired GCL sequence.

INDUSTRIAL APPLICABILITY

The present invention is preferably used for wireless communication devices including a base station device that transmits SCH in which respective elements of GCL sequence having a GCL sequence index that is unique cell information concerning the base station device are assigned to SCH symbols, and a mobile station device that receives the SCH and identifies the unique cell information u, but not limited thereto.

The invention claimed is:

1. A wireless communication method, comprising:
allocating, by a base station device, elements of a sequence having an index indicative of a communication parameter to synchronization channel symbols;
generating, by the base station device, a synchronization channel while maintaining symmetry of the sequence;
transmitting, by the base station device, signals including the synchronization channel;
receiving the signals by a mobile station device;
correcting, by the mobile station device, the signals based on the symmetry of the sequence; and
extracting, by the mobile station device, the communication parameter.

2. A receiving method for a wireless communication device to receive signals including a synchronization channel to which elements of a sequence having an index indicative of a communication parameter are allocated as synchronization channel symbols while symmetry of the sequence is maintained, the receiving method comprising:
receiving the signals;
correcting the signals based on the symmetry of the sequence; and
extracting the communication parameter.

3. A wireless communication method, comprising:
allocating, by a base station device, elements of a sequence having an index indicative of a communication parameter to synchronization channel symbols;
generating, by the base station device, a synchronization channel while maintaining symmetry of the sequence;
transmitting, by the base station device, signals including the synchronization channel;
receiving, by a mobile station device, the signals which are faded and have a half frequency band of the synchronization channel;
interpolating, by the mobile station device, a remaining half of the synchronization channel based on the symmetry of the sequence; and
extracting, by the mobile station device, the communication parameter.

4. A receiving method for a wireless communication device to receive signals including a synchronization channel to which elements of a sequence having an index indicative of a communication parameter are allocated as synchronization channel symbols while symmetry of the sequence is maintained, the receiving method comprising:
receiving the signals which are faded and have a half frequency band of the synchronization channel;
interpolating a remaining half of the synchronization channel based on the symmetry of the sequence; and
extracting the communication parameter.

5. A wireless communication device that receives a synchronization channel to which elements of a sequence having an index indicative of a communication parameter are allocated as synchronization channel symbols while symmetry of the sequence is maintained, and detects the communication parameter, the wireless communication device comprising:
a synchronization channel detector that detects the synchronization channel from received signals;
a Fourier transformer that performs a Fourier transform on the synchronization channel to output the synchronization channel symbols;
a symbol corrector that corrects the synchronization channel symbols based on the symmetry of the sequence; and
an index detector that detects the index of the sequence based on the synchronization channel symbols corrected.

6. The wireless communication device according to claim 5, wherein the symbol corrector divides the synchronization channel symbols into two groups based on the symmetry of the sequence and generates, based on one of the two groups which is in better reception condition, the other group of synchronization channel symbols to correct the synchronization channel symbols.

7. The wireless communication device according to claim 5, wherein the symbol corrector compares two of the synchronization channel symbols which are in symmetric relationship with each other based on the symmetry of the sequence, and corrects one of the two synchronization channel symbols by substituting the one of the two synchronization channel symbols with the other of the two synchronization channel symbols which is in a better reception condition as a result of the comparison.

8. The wireless communication device according to claim 5, wherein the symbol corrector corrects one of two synchronization channel symbols in symmetric relation with each other based on the symmetry of the sequence by adding the other of the two synchronization channel symbols to the one of the two synchronization channel symbols.

9. A wireless communication device that receives signals in a half frequency band of a synchronization channel to which elements of a sequence having an index indicative of a communication parameter are allocated as synchronization channel symbols while symmetry of the sequence is maintained, and detects the communication parameter, the wireless communication device comprising:
- a synchronization channel detector that detects the synchronization channel from the signals received;
- a Fourier transformer that performs a Fourier transform on the synchronization channel to output the synchronization channel symbols;
- a symbol interpolator that interpolates synchronization channel symbols in a remaining half of the frequency band based on the symmetry of the sequence; and
- an index detector that detects the index of the sequence based on the synchronization channel symbols interpolated.

10. The wireless communication device according to claim 6, wherein the symbol corrector compares each of reception power levels of the synchronization channel symbols with a threshold power level and corrects the synchronization channel symbols by substituting one of the two groups which includes the smaller number of synchronization channel symbols having reception power levels smaller than the threshold power level with the other group.

* * * * *